(12) United States Patent
Kawano et al.

(10) Patent No.: US 6,285,474 B1
(45) Date of Patent: Sep. 4, 2001

(54) HOLOGRAPHIC RECORDING METHOD AND FILTERING METHOD

(75) Inventors: Katsunori Kawano; Jiro Minabe; Takehiro Niitsu; Tsutomu Ishii; Yasunari Nishikata; Kazuo Baba, all of Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/577,842

(22) Filed: May 25, 2000

(30) Foreign Application Priority Data

Jul. 2, 1999 (JP) ................................... 11-189717

(51) Int. Cl.$^7$ ....................................................... G03H 1/16
(52) U.S. Cl. ................... 359/29; 359/10; 359/11; 359/561; 356/495
(58) Field of Search ................... 359/10, 11, 22, 359/25, 29, 559, 561; 356/347, 495

(56) References Cited

U.S. PATENT DOCUMENTS

| | | | |
|---|---|---|---|
| 5,339,305 | * | 8/1994 | Curtis et al. ............................. 359/3 |
| 5,627,664 | * | 5/1997 | Trisnadi ................................. 359/11 |
| 5,995,223 | * | 11/1999 | Power ................................ 356/495 |

FOREIGN PATENT DOCUMENTS

| | | |
|---|---|---|
| 4-306787 | 10/1992 | (JP) . |
| 7-248718 | 9/1995 | (JP) . |

OTHER PUBLICATIONS

J. L Horner et al. *Applied Optics*,vol. 23, No 6, pp. 812–816, 1984.

Y. Sheng et al., Optics Letters, vol. 18, No. 4, pp. 299–301, 1993.

S. H. Lee, Optical Engineering, vol. 13, No. 3, pp. 196–207, 1974.

Y. Li et al., Oprical Engineering, vol. 31, No. 9, pp. 1865–1885, 1992.

D. Mendlovic et al., Applied Optics, vol. 32, No. 32, pp. 6542–6546, 1993.

J. Widjaja et al., Optics Communications, pp. 123–126, 1995.

* cited by examiner

*Primary Examiner*—Darren Schuberg
(74) *Attorney, Agent, or Firm*—Oliff & Berridge, PLC

(57) ABSTRACT

A method and an apparatus capable of filtering based on desired spatial frequency characteristics without loss of Fourier spectrum frequency components, and of matched filtering of high recognition capability without losing functions of data recording and reconstruction as well as high-speed transmission and retrieval features and mass storage capacity characteristic of a holographic memory. Fourier transformed object light with 0° polarization of a target image is stored as a hologram using reference light having a spatial polarization distribution such that a daughter wavelet on scale m has 90° polarization. The hologram is retrieved using the Fourier transformed object light with 0° polarization. The hologram yields diffracted light in the form of a spatial frequency component which corresponds to scale m and is polarized 90° with respect to the other spatial frequency components. A polarizing element is used to extract only the spatial frequency component corresponding to scale m. Given reference light having a spatial polarization distribution in conformity with a shape of a spatial frequency filter, retrieval light of 0° polarization is applied for low-pass and high-pass filtering upon reconstruction.

31 Claims, 17 Drawing Sheets

*FIG.1A*
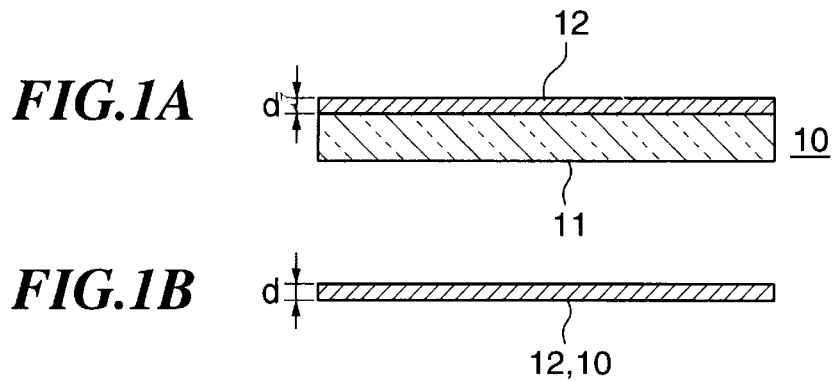
*FIG.1B*
*FIG.2*
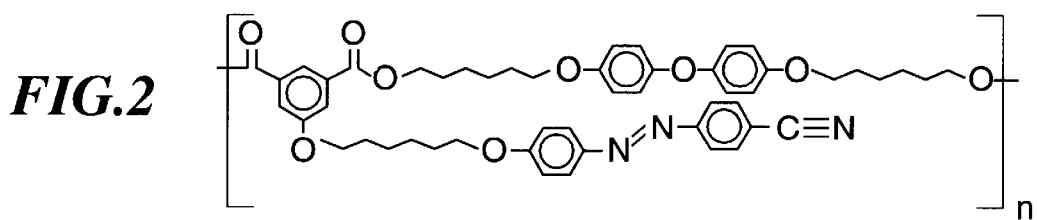
*FIG.3*
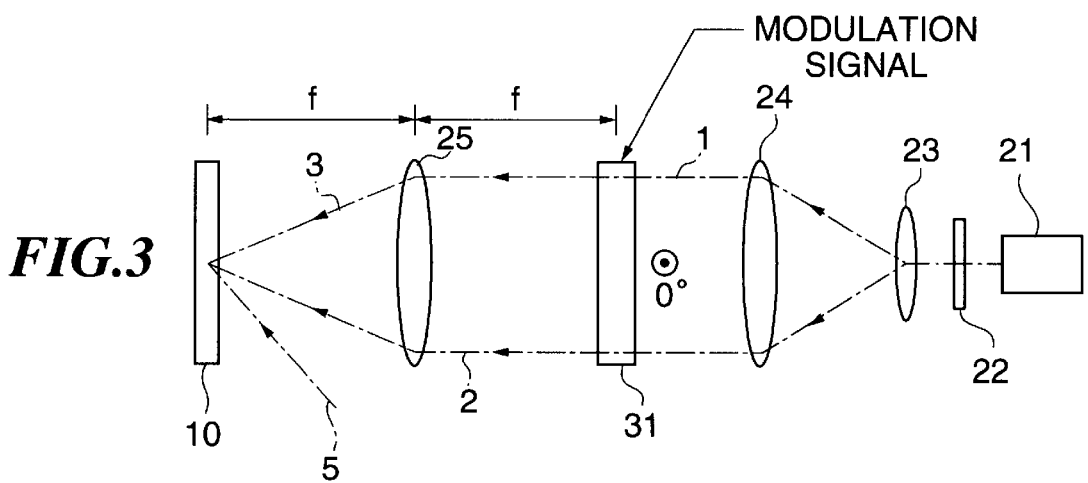

HOLOGRAPHIC RECORDING METHOD AND FILTERING METHOD

BACKGROUND OF THE INVENTION

1. Field of the Invention

The present invention relates to a method and an apparatus for recording and reconstructing various images as holograms, and to a method and an apparatus for performing diverse kinds of spatial frequency filtering such as low-pass filtering, high-pass filtering, wavelet transform and matched filtering during the process of holographic recording and reconstruction.

2. Description of the Related Art

The so-called holographic memory is getting attention for its ability to rapidly record and reconstruct images in increments of pages, and to record plural pages of images in multiplexed fashion within the same volume of an optical storage medium thereby storing huge quantities of image data. As such, the holographic memory is sometimes referred to as a promising next-generation computer file memory.

The holographic memory is used not only to record and reconstruct images but also to execute spatial frequency filtering for such purposes as image analysis, image compression, image decomposition and image retrieval. Spatial frequency filtering is a technique that involves carrying out optical Fourier transform to acquire a two-dimensional spectrum of input images and getting the acquired spectrum changed by use of a spatial frequency filter. This is a typical parallel optical computing technique capable of performing diverse kinds of computation and thus considered an optical convolution.

Typical devices of spatial frequency filtering (abbreviated to "filtering" hereunder where appropriate) include low-pass filters, high-pass filters and band-pass filters.

Generally, low-frequency components in the spectrum of an image correspond to an approximate structure of the image while high-frequency components constitute edges and fine structures of the image. A low-pass filter allows only low-frequency components of the image spectrum to pass through while blocking high-frequency component noise. Conversely, a high-pass filter lets high-frequency components alone to pass in order to extract image edges and highlight fine structures of the image. A band-pass filter permits only a specific spatial frequency band to pass through in such applications as image compression and analysis.

Holographic technology affords spatial frequency filters complex amplitude characteristics that provide optical correlation. This makes it possible to perform pattern recognition and retrieval.

Usually, undulating complex amplitude distributions cannot be recorded directly. Only light intensity distributions can be directly measured, and photography merely records intensity distributions. In contrast, holography permits recording and reconstruction of complex amplitude distributions by introducing carrier components into the distributions.

A filter that takes advantage of the above characteristic of holography is what is known as the matched filter. In computing correlations between a reference image and input images, the matched filter checks to see whether a specific pattern exists in a two-dimensional image, and detects the location of such a pattern if it is found to exist.

More robust variations of the matched filter have been proposed to implement higher capabilities of recognition. These variations include a phase-only matched filter (J. L. Horner et al., APPLIED OPTICS Vol. 23, pp. 812–816 (1984)) and a wavelet matched filter (Y. Sheng et al., OPTICS LETTERS Vol. 18, pp. 299–301 (1993)).

The phase-only matched filter records only phase components of a Fourier transformed image of an input object and phase components of a Fourier transformed image of a reference object. In addition to its enhanced efficiency of light utilization, the phase-only matched filter has correlation values in a $\delta$ function through autocorrelation. This affords the phase-only matched filter a higher recognition capability than that of conventional matched filters.

Features of an image tend to concentrate on its contour portions. Taking advantage of this fact, the waveletmatched filter removes low-frequency components of the reference and input images through wavelet transform and computes correlations between the high-frequency components involved, thereby attaining a high recognition capability.

Conventional methods for holographic recording and reconstruction as well as for filtering are described below with reference to FIGS. 23 through 25.

For holographic recording, parallel light 1 is applied to an image 91 to yield object light 2 as shown in FIG. 23. The object light 2 is subjected to Fourier transform by a lens 92. Transformed object light 3 is applied to an optical storage medium 93 while plane wave reference light 5 is emitted simultaneously to the storage medium 93 to record a hologram therein.

For holographic reconstruction, as depicted in FIG. 24, the same reference light 5 as that in recording is emitted to the optical storage medium 93. In response, the stored hologram yields diffracted light 6A onto an optical path of object light. The diffracted light 6A is subjected to inverse Fourier transform by a lens 94. Transformed diffracted light 7A is sent to a photo detector 95 to form an image thereon.

The reconstructed image is filtered as follows: a filter 100 having a two-dimensional transmittance distribution is interposed between the optical storage medium 93 and the lens 94. The filter thus positioned extracts only desired spatial frequency components from a Fourier spectrum of the diffracted light 6A.

Illustratively, low-pass filtering is carried out by getting the filter 100 to let pass only the low-frequency spectrum components at a central position of the Fourier spectrum of the diffracted light 6A while blocking peripherally located high-frequency spectrum components. High-pass filtering is performed in a reverse fashion. That is, the low-frequency spectrum components at the central position are blocked and the filter 100 allows only the high-frequency spectrum components on the periphery to pass through.

For computation of correlations between images, parallel light 1 is applied to an image 96 to obtain object light 2a as shown in FIG. 25. The object light 2a is subjected to Fourier transform by a lens 97. Transformed object light 3a is used as retrieval light that is emitted in the manner shown in FIG. 23 to the optical storage medium 93 that contains the image 91 as a hologram. In turn, the stored hologram yields diffracted light 6B onto an optical path of reference light. The diffracted light 6B is subjected to inverse Fourier transform by a lens 98. Transformed diffracted light 7B is sent to a photo detector 99 to form an image thereon.

For the recording method of FIG. 23, it is assumed for the purpose of simplification that a wave number vector k of object light conforms to the wave number of reference light; and that the object light 2 before Fourier transform is expressed as Oexp(−ikr), the object light 3 after Fourier transform as oexp(-ik'r), and the reference light 5 as R(=R*). On that assumption, a hologram T held on the optical storage medium 93 is defined by the expression (1) below. In the expression (1) and subsequent expressions, α is used to signify proportion.

$$T\alpha |R+o\exp(-ik'r)|^2 = |R|^2 + |o|^2 + R^* o\exp(-ik'r) + R^* o\exp(-ik'r) \quad (1)$$

For the reconstructing method of FIG. 24, the hologram T may be subjected to the same reference light R(=R*) as the reference light 5 in effect for recording. In that case, diffracted light is defined by the following expression:

$$RT\alpha \{R|R|^2 + R|o|^2 + RR^* o\exp(-ik'r) + RRo^* \exp(-ik'r)\} \quad (2)$$

Because the reference light R(=R*) is plane wave light and because the third term in the expression (2) above is diffracted onto the optical path of object light, reconstructed diffracted light I (i.e., diffracted light 6A) is defined as $$I\alpha o\exp(-ik'r) \quad (3)$$

When the reconstructed diffracted light I is subjected to inverse Fourier transform by the lens 94, object light Oexp(-ikr) is obtained as the diffracted light 7A.

Meanwhile, for the correlation computing method of FIG. 25, the hologram T may be subjected to the same object light oexp(-ik'r) as the object light in effect for recording. In that case, the diffracted light is defined by the following expression:

$$o\exp(-ik'r)T \; \alpha(o\exp(-ik'r)|R|^2 + o\exp(-ik'r)|o|^2 + o\exp(-ik'r)R^* o\exp(-ik'r) + o\exp(-ik'r)Ro^* \exp(ik'r) \quad (4)$$

Because the fourth term in the expression (4) above is diffracted onto the optical path of reference light, the reconstructed diffracted light I (i.e., diffracted light 6B) is defined as $$I\alpha oo^* \quad (5)$$

When the reconstructed diffracted light I is subjected to inverse Fourier transform by the lens 98, autocorrelation value o★o* of object light is obtained as the diffracted light 7B. In this case, $$o \star o^* = \int_{-\infty}^{\infty} o(r')o^*(r'-r)dr' \quad (6)$$

where, $\int_{-\infty}^{\infty}$ signifies integration from -∞ to ∞.

Applying object light of a desired image 96 as the object light 3a yields values of cross correlation between the image 96 and the image 91 stored as the hologram T. This provides matched filtering.

FIG. 26A shows a recorded hologram of an image containing numerous alphabetic characters as object light. FIG. 26B depicts a case where alphabetic character K is applied as a retrieved image. In this case, as shown in FIG. 26C, an autocorrelation peak appears in the location of the alphabetic character K in the stored image. Because cross correlation values with respect to the other alphabetic characters are judged to be smaller than the autocorrelation value, the presence and location of retrieved image K are detected in the stored image.

The conventional filtering methods outlined above have some disadvantages. The filter 100 having a two-dimensional transmittance distribution allows certain frequency components of the Fourier spectrum of the diffracted light 6A to pass through while blocking the remaining frequency components. The blocked frequency components are lost on the downstream side of filter 100 and are not available for acquiring reconstructed images of other frequencies. In other words, where the filter 100 is used as a low-pass filter, the high-frequency spectrum components of the diffracted light 6A are lost on the downstream side of the filter 100. Conversely, where the filter 100 is used as a high-pass filter, the low-frequency spectrum components of the diffracted light 6A are lost on the downstream side of the filter 100.

If it is desired to carry out low-pass and high-pass filtering concurrently, it is required conventionally to split the diffracted light 6A into two light waves on two optical paths. A low-pass filter needs to be positioned on one of the optical paths and a high-pass filter on the other optical path, with an inverse Fourier transform lens 94 and a photo detector 95 furnished on each optical path. The arrangements can amount to a complicated and bulky reconstructing optical system.

The conventional matched filtering method described above is capable of distinguishing autocorrelation values from cross correlation values with relative ease in images such as those in FIGS. 26A through 26C containing numerous high-order spatial frequency components. On the other hand, where images present numerous low-order spatial frequency components as in FIG. 27A, most of the image spectrum frequency components coincide with one another illustratively for a circle, a square and a triangle despite their obvious differences in shape. In such a case, if the image of, say, the triangle in FIG. 27B is desired to be retrieved, the autocorrelation and cross correlation values are hard to distinguish as shown in FIG. 27C. This makes it difficult to retrieve the target image.

One way to circumvent the difficulty above has been proposed as follows: as depicted in FIGS. 28A and 28B, contours (high-frequency components) of images, i.e., portions where image features concentrate, are extracted beforehand so that correlations between the contour images are computed. This makes it relatively easy to distinguish autocorrelation values from cross correlation values.

For example, the contour portions are extracted by use of a computer, or by an optical high-pass filtering method as disclosed in Japanese Published Unexamined Patent Application No. Hei 4-306787.

The above schemes require extraction of contour portions, which constitutes a specific preliminary process for correlation computation. This threatens to forfeit the high-speed retrieval capability of holographic memory. Holographic memory is deemed viable only if it ensures high-speed transmission, high-speed retrieval and mass storage capacity.

The above-described phase-only matched filter conceived as a matched filter of enhanced recognition capability offers correlation images of high S/N ratios. However, the filter is deprived of amplitude data about stored images and thus incapable of reconstructing original images. Likewise, the wavelet matched filter mentioned above provides high S/N ratios but lacks low-frequency components of stored images and is incapable of reconstructing original images. These matched filters are effective in computing correlations but no longer function as part of holographic memory for storing or reconstructing data.

SUMMARY OF THE INVENTION

In carrying out the invention, there is provided an optical recording method including the step of storing holograms onto an optical storage medium by simultaneously irradiating the optical storage medium with Fourier transformed object light and reference light having a spatial polarization distribution in conformity with a shape of a spatial frequency filter.

The present invention thus provides a method for filtering based on desired spatial frequency characteristics during the process of recording or reconstructing holograms, whereby complementary variations of filtering such as low-pass and high-pass filtering are carried out simultaneously without the loss of Fourier spectrum frequency components or without the need for a complicated or bulky apparatus.

The present invention also provides a method for matched filtering of high recognition capability without losing functions of data recording and reconstruction as well as high-speed transmission and retrieval features and mass storage capacity characteristic of a hologram memory.

According to one aspect of the invention, there is provided a filtering method including the step of irradiating an optical storage medium having holograms stored thereon by Fourier transformed object light and by reference light having a spatial polarization distribution in conformity with a shape of a spatial frequency filter with retrieval light having a spatial polarization distribution different from that of the reference light in order to retrieve part or all of spatial frequency spectrum components of the object light.

According to another aspect of the invention, there is provided a filtering method including the step of irradiating an optical storage medium having holograms stored thereon by Fourier transformed object light and by reference light having a spatial polarization distribution in conformity with a shape of a spatial frequency filter with Fourier transformed object light of a target image to be retrieved in order to compute and obtain correlation values on part or all of spatial frequency spectrum components between images stored in the holograms on the one hand and the target image on the other hand.

Materials that exhibit light-induced birefringence respond to the polarized state of incident light and can store directions of polarization in that light. For example, application of linearly polarized light induces photoisomerization in a polymer or polymer liquid crystal having a photoisomerizable radical in its side chain, or in a polymer with its photoisomerizable molecules doped. This isomerization produces the anisotropy of refractive index in keeping with the direction of the linearly polarized light, whereby the polarized direction is recorded and preserved.

Holograms are conventionally stored by subjecting object light and reference light to spatially constant polarization and by orienting the two kinds of polarization in the same direction.

Meanwhile, the above-mentioned materials that manifest light-induced birefringence are capable of recording holograms by having object polarization and reference polarization oriented in directions different from each other (e.g., perpendicular to each other). Illustratively, object light with 0° polarization is stored as a hologram using reference light with 90° polarization. The object light thus stored is retrieved as diffracted light with 0° polarization by use of retrieval light with 90° polarization.

It is also possible to store holograms by spatially modulating the polarization of object light or reference light. For example, object light with 0° polarization in a spatially middle portion and 90° polarization in the periphery may be stored as a hologram using reference light with 0° polarization. The object light thus stored is retrieved either as diffracted light with 0° polarization in the spatially middle portion and 90° polarization in the periphery by use of retrieval light with 0° polarization, or as diffracted light with 0° polarization by use of retrieval light with 0° polarization in the spatially middle portion and 90° polarization in the periphery.

Conversely, object light with 0° polarization may be stored as a hologram by use of reference light with 0° polarization in the spatially middle portion and 90° polarization in the periphery. The object light thus stored is retrieved either as diffracted light with 0° polarization by use of retrieval light with 0° polarization in the spatially middle portion and 90° polarization in the periphery, or as diffracted light with 0° polarization in the spatially middle portion and 90° polarization in the periphery by use of retrieval light with 0° polarization.

Taking advantage of the above characteristics, the inventive hologram recording method subjects an optical storage medium to simultaneous application of Fourier transformed object light and reference light having a spatial polarization distribution in conformity with a shape of a spatial frequency filter, whereby holograms are stored onto the optical storage medium.

Illustratively, Fourier transformed object light may be used as light with 0° polarization. Reference light may have a spatial polarization distribution wherein the light is polarized by 90° in the spatially middle portion corresponding to low-frequency spectrum components of object light, and polarized by 0° in the periphery corresponding to high-frequency spectrum components of the object light.

At the time of reconstruction, a hologram recorded in the manner described is subjected illustratively to application of reference light with 0° polarization. Low-frequency spectrum components of object light, recorded by use of reference light components with 90° polarization, are retrieved as diffracted light components with 90° polarization through a 90° rotation by use of reference light with 0° polarization. High-frequency spectrum components of the object light, recorded by use of reference light components with 0° polarization, are retrieved as diffracted light components with 0° polarization without rotations by use of reference light with 0° polarization. The diffracted light from the hologram has the same amplitude distribution as the object light but is polarized by 90° in the low-frequency spectrum components and by 0° in the high-frequency spectrum components.

If a polarizing element or polarizer is located on an optical path of the diffracted light and if the orientation of the element is adjusted to 90°, then the element executes low-pass filtering, providing a low-frequency reconstructed image formed only by the low-frequency spectrum components of the object light. If the orientation of the polarizing element is adjusted to 0°, the polarizing element carries out high-pass filtering, generating a high-frequency reconstructed image made only of the high-frequency spectrum components of the object light.

At the time of image recording, the spatial polarization distribution of reference light is illustratively made to comply with a matched filter. For image retrieval, object light of a target image with 0° polarization is illustratively applied to a hologram containing the target image. In turn, the hologram yields diffracted light wherein a given spatial frequency component is 90° apart from the other spatial frequency components. Using a polarizing element to extract a desired spatial frequency component provides a correlation image of a high S/N ratio whereby the intensity of an autocorrelation image is made higher than that of a cross correlation image. This makes it possible to implement matched filtering of high recognition capability without losing functions of data recording and reconstruction as well as high-speed transmission and retrieval features and mass storage capacity characteristic of a holographic memory.

Other features and advantages of the invention will become more apparent upon a reading of the following description and appended drawings.

BRIEF DESCRIPTION OF THE DRAWINGS

Preferred embodiments of the present invention will be described in detail with reference to the following figures in which:

FIGS. 1A and 1B are schematic views of optical storage media for use with an inventive method;

FIG. 2 is a view of a chemical formula representing a material used as the optical storage medium for use with an inventive method;

FIG. 3 is a schematic view of a recording optical system used in experiments;

DESCRIPTION OF THE PREFERRED EMBODIMENTS

Examples of Optical Storage Medium (FIGS. 1A through 7)

An optical storage medium 10 used by inventive methods is typically made of an optical storage layer 12 formed on one side of a transparent substrate 11 as shown in FIG. 1A, or constituted solely of an optical storage layer 12 as depicted in FIG. 1B.

Any material will do for use as the optical storage layer 12 as long as it exhibits light-induced birefringence and is capable of recording and preserving directions of polarization in incident light. A preferred material is a polymer or polymer liquid crystal having a photoisomerizable radical in its side chain, or a high polymer with its photoisomerizable molecules doped. The photoisomerizable radical or molecules should preferably include an azobenzene structure.

One of the most preferred materials for the optical storage layer 12 is polyester having cyanoazobenzene units in the side chain as expressed by the chemical formula in FIG. 2. This material can record and preserve the direction of polarization of incident light thanks to light-induced photoisomerization of cyanoazobenzene units in the side chain.

Figure 4:
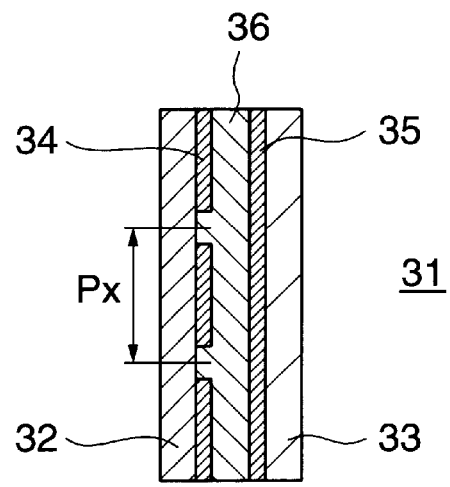
FIG. 4 is a schematic view of a spatial light modulator capable of polarized modulation.
Figure 5:
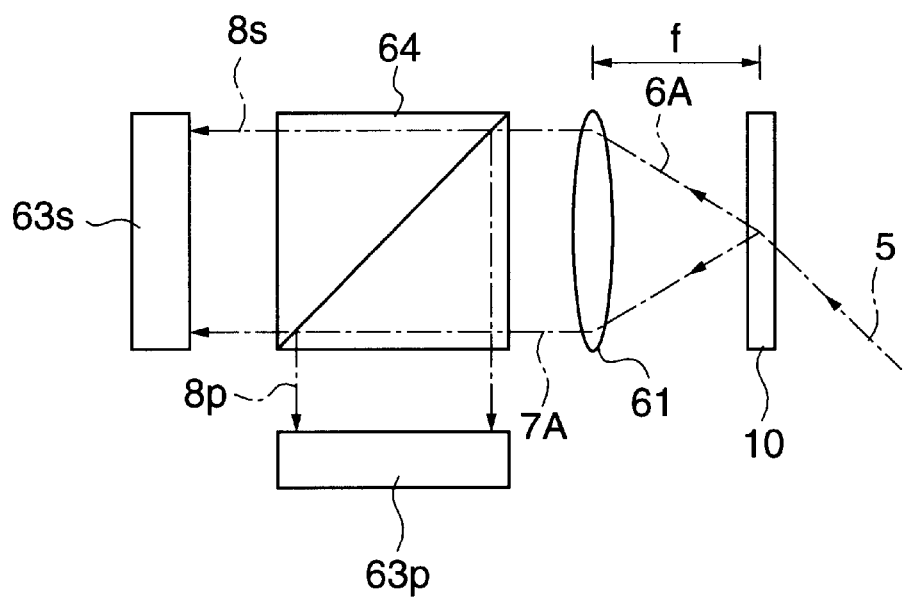
FIG. 5 is a schematic view of a reconstructing optical system used in experiments.

Using optical systems shown in FIGS. 3 through 5, the inventors of this invention verified through experiments that polyester having cyanoazobenzene units in the side chain can faithfully record and reconstruct a spatial polarization distribution of object light or reference light in the form of a hologram. The experiments were conducted as follows:

The optical storage medium 10 was constituted of an optical storage layer made of polyester having cyanoazobenzene units in the side chain. A light source 21 of the recording optical system in FIG. 3 was an oscillation line 515 nm of argon ion laser to which polyester having cyanoazobenzene units in the side chain is sensitive.

Light from the light source 21 was made to pass a half-wave plate 22 to produce linearly polarized light of a suitable orientation (illustratively at 0°). The linearly polarized light was led to pass lenses 23 and 24 to form parallel light 1 of a large aperture. The parallel light 1 was entered into a spatial light modulator 31 capable of modulation by polarization.

The spatial light modulator 31 was an electrically addressed type having transparent substrates 34 and 35 sandwiched between transparent substrates 32 and 33, the substrates 34 and 35 in turn sandwiching liquid crystal therebetween as an electro-optic modulator 36, as shown in FIG. 4. This modulator was a variation of a liquid crystal panel for projector use minus its polarizing plate. As such, the modulator also functioned as a half-wave plate capable of rotating as desired in the direction of polarization of incident light for each pixel Px.

Figure 6A:
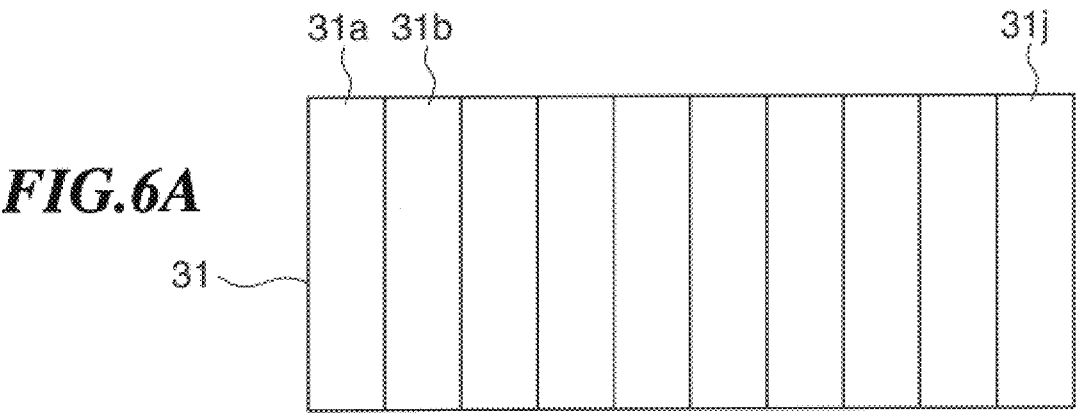
FIGS. 6A through 6D are views showing polarization distributions of object light used in experiments as well as intensities of reconstructed light resulting from experiments.
Figure 6B:
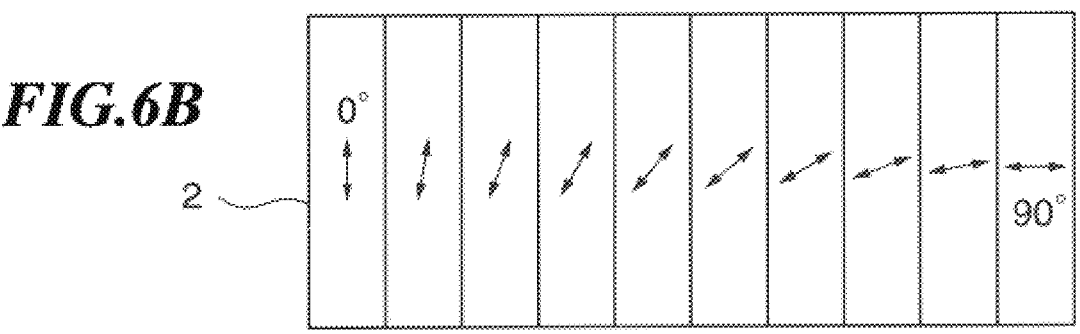

In the spatial light modulator 31, light passed through 10 pixel regions 31a to 31j divided in one direction as indicated in FIG. 6A under control by modulation signals. This yielded object light 2 having its direction of polarization varied from zero to 90° in increments of 10° over the 10 spatial portions divided unidirectionally, as shown in FIG. 6B.

A lens 25 subjected the object light 2 to Fourier transform. Transformed object light 3 was applied to the optical storage medium 10. Simultaneously, the optical storage medium 10 was irradiated with reference light 5 with 0° polarization acquired from the light source 21, whereby a hologram was recorded on the optical storage medium.

At the time of reconstruction, as shown in FIG. 5, the optical storage medium 10 having the hologram recorded as described above was irradiated with reference light with 0° polarization, the same reference light as that in recording. Under irradiation, the stored hologram yielded diffracted light 6A that was subjected to inverse Fourier transform using a lens 61. Transformed diffracted light 7A was reflected by a polarizing beam splitter 64. The splitter 64 by reflection produced reconstructed light 8p to form an image on a photo detector 63p. The polarizing beam splitter 64 also let the diffracted light 7A pass therethrough as reconstructed light 8s to form an image on a photo detector 63s.

Figure 6C:
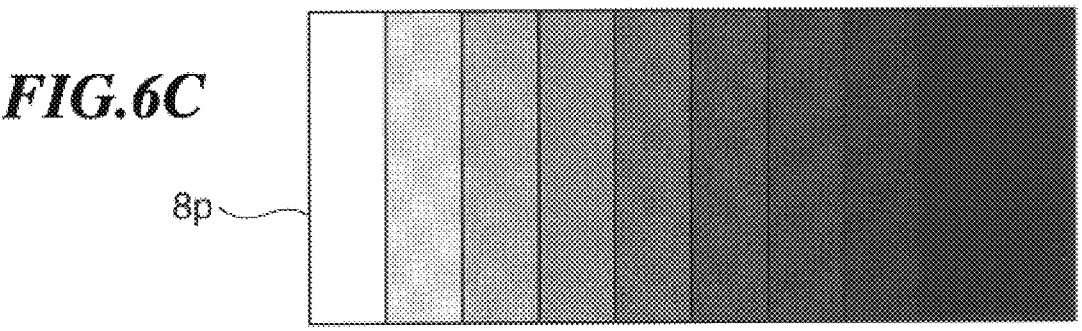
Figure 6D:
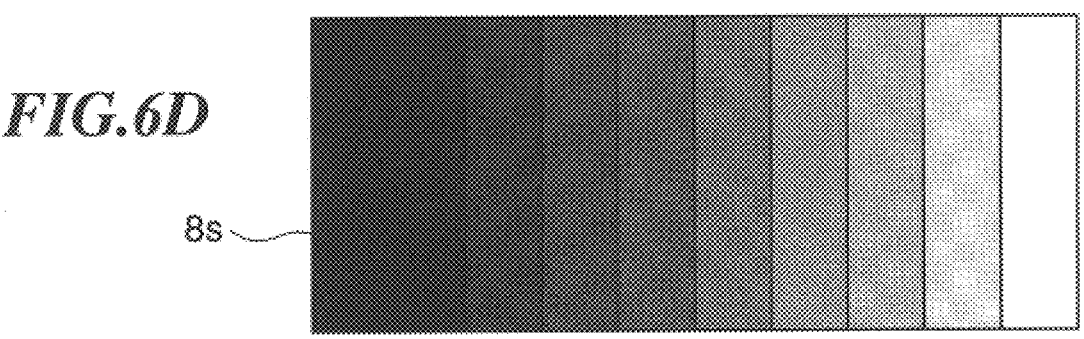
Figure 7:
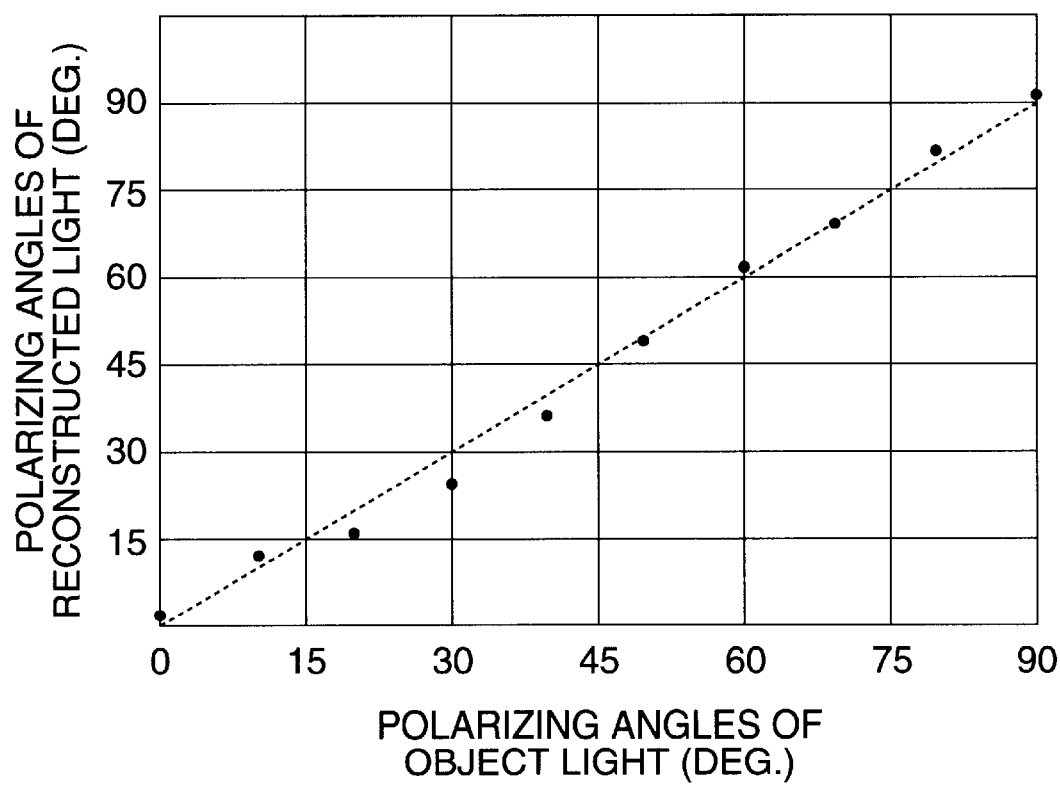
FIG. 7 is a graphic representation of polarizing angles of reconstructed light versus polarizing angles of object light resulting from experiments.

As a result, the reconstructed light 8p formed an image whose light intensity ranged progressively from a maximum to a minimum in a space divided into 10 portions in one direction, as shown in FIG. 6C. The reconstructed light 8s produced an image whose light intensity ranged in an inversely progressive manner from a maximum to a minimum in the 10 divided portions, as depicted in FIG. 6D.

Polarization distribution of the reconstructed light 8p (diffracted light 7A) was computed on the basis of a light intensity distribution ratio of one image to the other above. The computation revealed that the angle of polarization of the object light 2 was the same as that of the reconstructed light 8p (diffracted light 7A). The angle of polarization of the object light 2 was 90° apart from that of the reconstructed light 8s.

The polyester having cyanoazobenzene units in the side chain was thus found faithfully to record and reconstruct as a hologram the spatial polarization distribution of the object light. The same applied to the spatial polarization distribution of the reference light.

Figure 8:
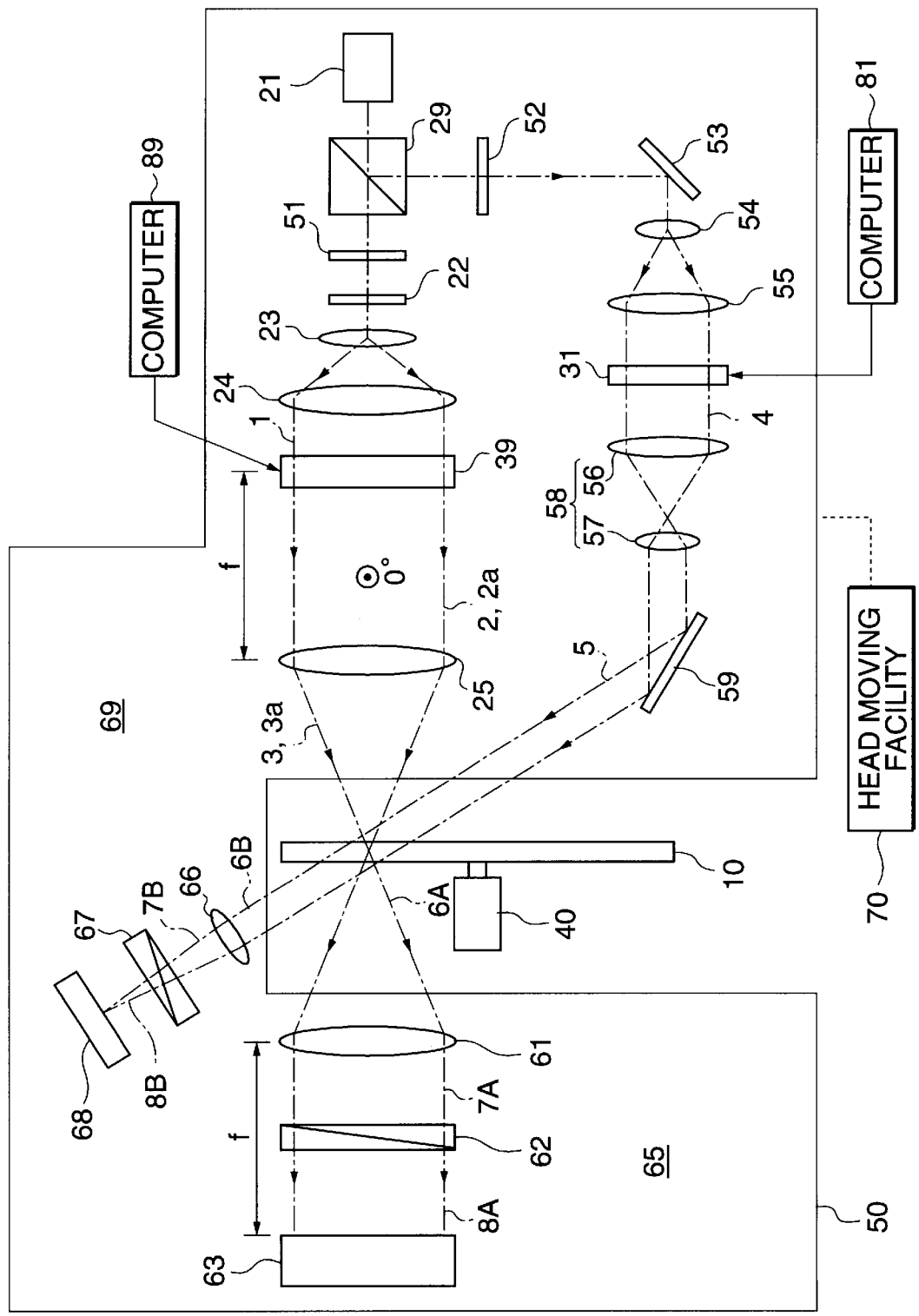
FIG. 8 is a schematic view of a holographic recording and reconstructing apparatus and a filtering apparatus embodying the invention.
Figure 9:
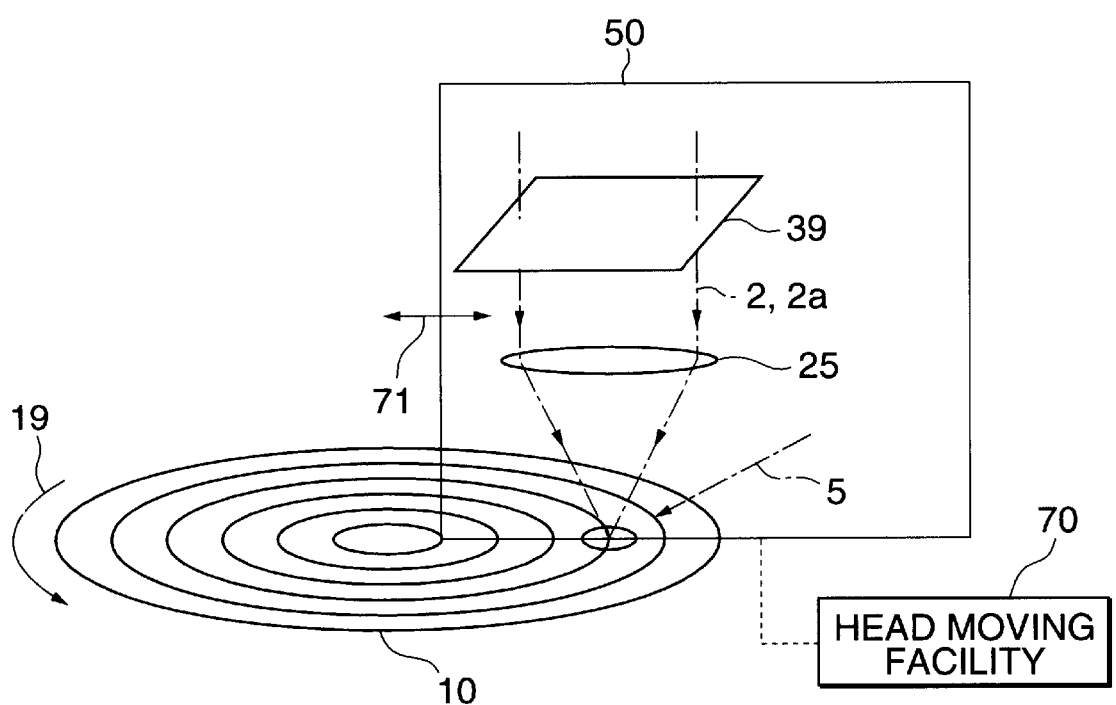
FIG. 9 is a schematic view showing how an optical storage medium rotates and how an optical head moves in the embodiment of FIG. 8.

Embodiments of Holographic Recording and Reconstructing Apparatus and Filtering Apparatus (FIGS. 8 and 9)

FIG. 8 is a schematic view of a holographic recording and reconstructing apparatus and a filtering apparatus embodying the invention. This is a single setup designed to carry out recording and reconstruction of holograms, filtering operations including wavelet transform, and matched filtering (correlation computation).

For the purpose of illustration, the setup of FIG. 8 is shown emitting object light beams 3 and 3a as well as reference light 5 simultaneously to an optical storage medium 10 so that diffracted light beams 6A and 6B are obtained at the same time from the medium 10. For recording, in practice, only the object light 3 and reference light 5 are applied. For reconstruction, the reference light 5 alone is emitted so that solely the diffracted light 6A is acquired. Upon correlation computation, the object light 3a alone is applied in order to obtain the diffracted light 6B only.

The optical storage medium 10 is illustratively a disc type medium formed by polyester having cyanoazobenzene units in the side chain shown in FIG. 2.

A light source 21 of an optical head 50 emits coherent light to which the optical storage medium 10 is sensitive. Where the medium 10 is made of polyester having cyanoazobenzene units in the side chain, an oscillation line 515 nm of argon ion laser is illustratively utilized.

Light from the light source 21 is introduced into a beam splitter 29. For recording or correlation computation, a shutter 51 is opened to let the light from the beam splitter 29 pass through a half-wave plate 22 so as to produce linearly polarized light of a suitable orientation (illustratively at 0°). The linearly polarized light is led to pass lenses 23 and 24 to form parallel light 1 of a large aperture. The parallel light 1 is entered into a spatial light modulator 39.

A computer 89 causes the spatial light modulator 39 to display an image to be recorded or retrieved. Object light 2 or 2a with 0° polarization is obtained downstream of the spatial light modulator 39. Illustratively, a transparent liquid crystal panel may serve as the modulator 39.

The object light 2 or 2a is subjected to Fourier transform using a lens 25. Transformed object light 3 or 3a is applied to the optical storage medium 10.

For recording or reconstruction, a shutter 52 is opened to let reflected light from the beam splitter 29 be reflected again by a mirror 53. The reflected light from the mirror 53 is led to pass lenses 54 and 55 to form parallel light of a large aperture. The parallel light is entered into a spatial light modulator 31 capable of modulation by polarization. Illustratively, the spatial light modulator 31 may be an electrically addressed type such as the one shown in FIG. 4.

A computer 81 controls pixels of the spatial light modulator 31 to modulate passing light in spatial polarization. Reference light 4 is obtained downstream of the spatial light modulator 31. For recording, the reference light 4 is arranged to have a spatial polarization distribution in conformity with a shape of a spatial frequency filter as will be described later; for original image reconstruction, the reference light 4 is given the same spatial polarization distribution as that in recording; for filtering, the reference light 4 is illustratively spatially coherent plane wave light with 0° polarization.

The reference light 4 is reduced by a reducing optical system 58 having lenses 56 and 57. The reduced light is reflected by a mirror 59 to form the reference light 5 for application onto the optical storage medium 10.

For reconstruction, the shutter 51 is closed to cut off the object light. For correlation computation, the shutter 52 is closed to cut off the reference light.

Upon reconstruction, the reference light above is applied onto a hologram stored on the optical storage medium 10. Under reference light application, the hologram yields the diffracted light 6A onto the optical path of the object light. The diffracted light 6A is subjected to inverse Fourier transform using a lens 61. Transformed diffracted light 7A is introduced into an analyzer 62. Diffracted light 8A past the analyzer 62 is applied to a photo detector 63 to forman image thereon. The analyzer 62 has its orientation adjusted in a manner to be described later.

For correlation computation, the object light 3a of the image to be retrieved is applied to the hologram stored on the optical storage medium 10. Under object light application, the hologram yields the diffracted light 6B onto the optical path of the reference light. The diffracted light 6B is subjected to inverse Fourier transform using a lens 66. Transformed diffracted light 7B is introduced into an analyzer 67. Diffracted light 8B past the analyzer 67 is input to a photo detector 68 to form an image thereon. The analyzer 67 has its orientation adjusted in a manner to be described later.

In the above embodiments, a motor 40 rotates the optical storage medium 10 in the direction indicated by an arrow 19 in FIG. 9. This makes it possible to store plural holograms at different locations on the optical storage medium 10 in its circumferential direction, and to retrieve images from such plural holograms.

A head moving facility 70 may move theoptical head 50 over the optical storage medium 10 in its radial direction as indicated by an arrow 71 in FIG. 9. This makes it possible to store holograms onto regions constituted by concentric recording tracks on the optical storage medium 10, and to retrieve images from the holograms stored on such concentric recording tracks.

Recording and Reconstruction of Holograms and Filtering (FIGS. 10 through 16B)

Figure 10:
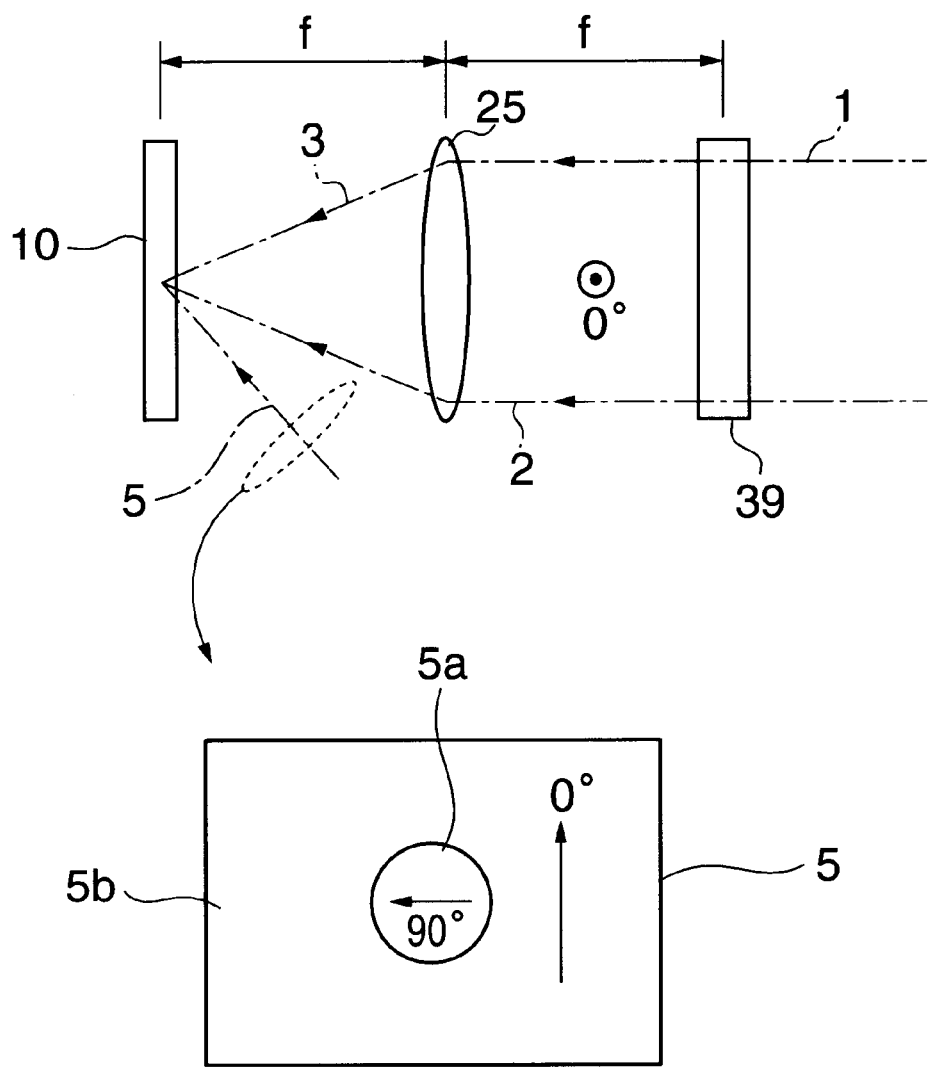
FIG. 10 is a schematic view of a holographic recording method embodying the invention.

Holographic Recording (FIG. 10)

With the setup of FIG. 8 in use, a hologram is stored onto the optical storage medium 10 as follows: Fourier transformed object light 3 with 0° polarization is applied to the optical storage medium 10 which is simultaneously irradiated with the reference light 5 generated as plane waves having a spatial polarization distribution in conformity with a shape of a spatial frequency filter, as shown in FIG. 10.

Illustratively for low-pass or high-pass filtering of a reconstructed image, the reference light 5 is polarized by 90° in a circular middle portion 5a corresponding to low-frequency spectrum components of the object light 3, and polarized by 0° in the remaining portion 5b corresponding to high-frequency spectrum components of the object light 3, as depicted in FIG. 10.

The arrangements above store the low-frequency spectrum of the object light 3 as a hologram using reference light components with 90° polarization, and record the high-frequency spectrum of the object light 3 as a hologram using reference light components with 0° polarization.

Figure 11:
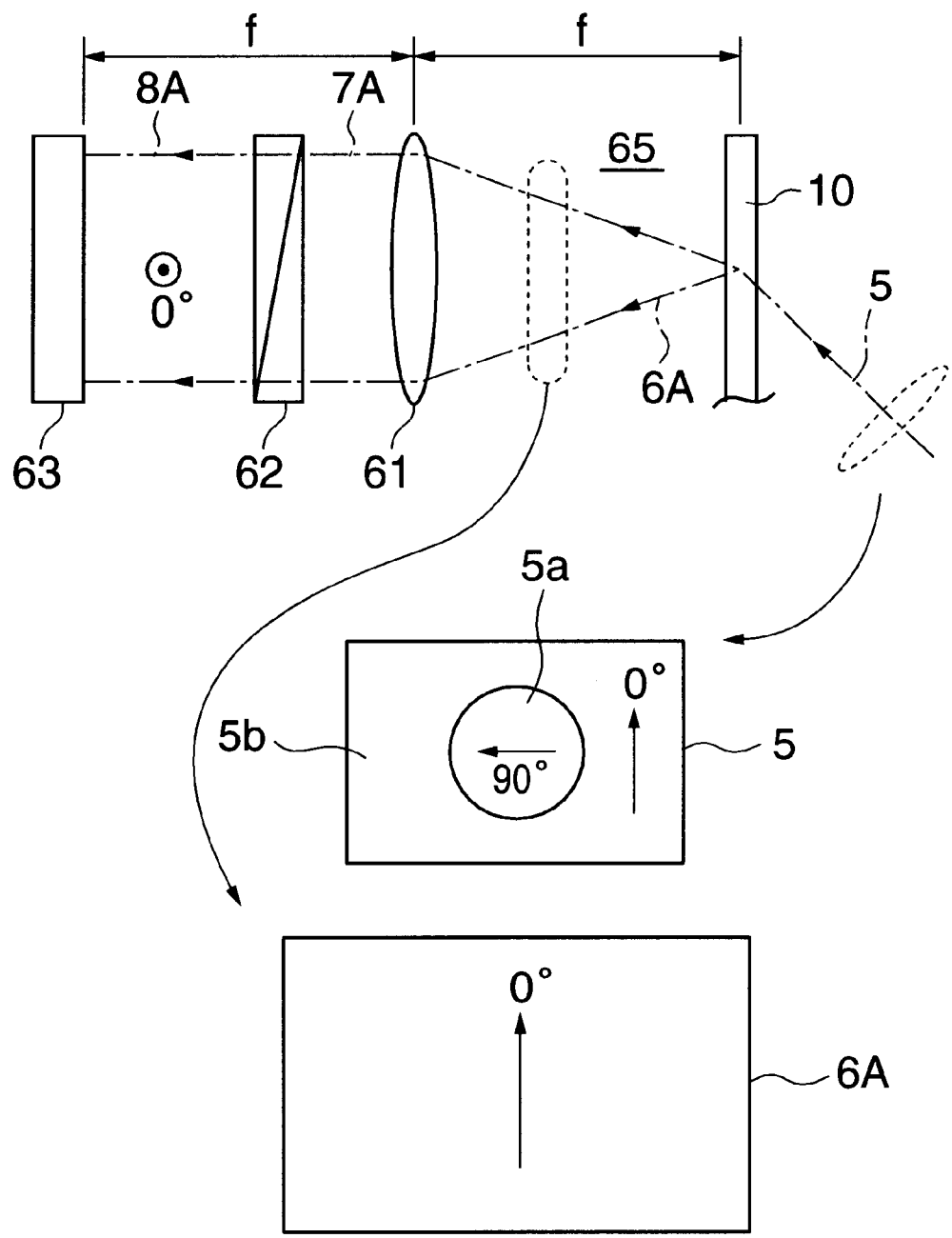
FIG. 11 is a schematic view of a holographic reconstructing method embodying the invention.

Original Image Reconstruction (FIG. 11)

An original image is reconstructed from the optical storage medium 10 carrying holograms, as follows: reference light having the same spatial polarization distribution as that in recording is applied to a region containing a relevant hologram on the optical storage medium 10. Illustratively, if the reference light for recording has a spatial polarization distribution shown in FIG. 10, then the reference light for reconstruction is arranged to have a spatial polarization distribution depicted in FIG. 11.

Low-frequency spectrum components of the object light 3, stored in the hologram using reference light components with 90° polarization, are retrieved by means of the reference light components with 90° polarization; high-frequency spectrum components of the object light 3, stored in the hologram using reference light components with 0° polarization, are retrieved by means of the reference light components with 0° polarization. The diffracted light 6A from the hologram is spatially coherent light with 0° polarization as illustrated in FIG. 11.

Thus if the orientation of the analyzer 62 is adjusted to 0°, then the diffracted light 8A past the analyzer 62 may be used to reconstruct an image formed by the low- and high-frequency spectrum components of the object light 3. This permits reconstruction of the original image.

Figure 12:
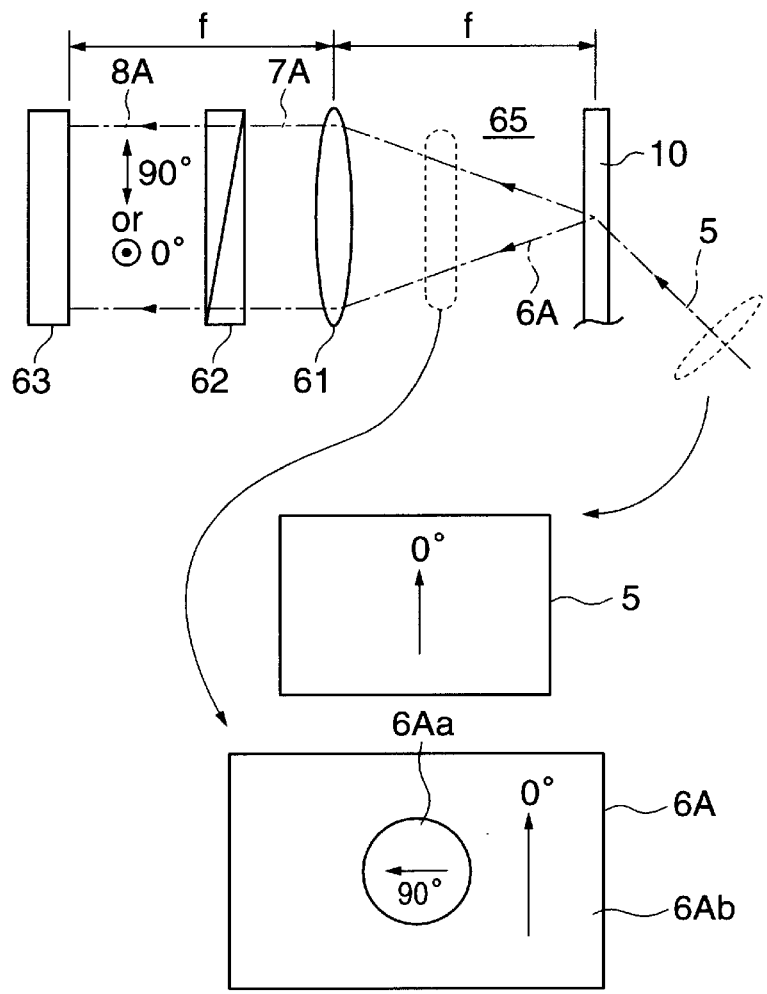
FIG. 12 is a schematic view of a filtering method embodying the invention.
Figure 13:
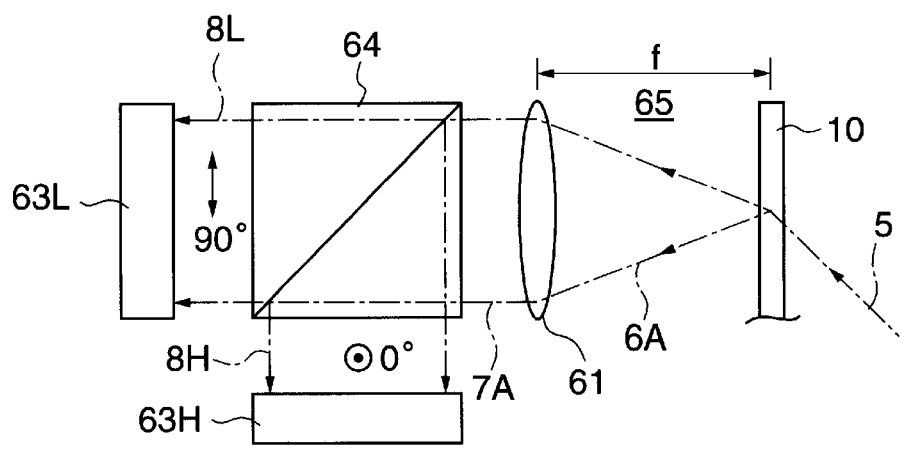
FIG. 13 is a schematic view of another filtering method embodying the invention.

Low-Pass and High-Pass Filtering (FIGS. 12 and 13)

For low-pass or high-pass filtering of a reconstructed image, reference light for reconstruction is arranged to have a spatial polarization distribution different from that of reference light for recording. Illustratively, as shown in FIG. 12, the reference light for reconstruction is arranged to be spatially constant light with 0° polarization.

Low-frequency spectrum components of the object light 3, recorded in a hologram using reference light components with 90° polarization, are retrieved as diffracted light components with 90° polarization through a 90° rotation using reference light with 0° polarization. High-frequency spectrum components of the object light 3, recorded using reference light components with 0° polarization, are retrieved as diffracted light components with 0° polarization without rotations using reference light with 0° polarization. The diffracted light 6A from the hologram has the same amplitude distribution as the object light 3 but is polarized by 90° in low-frequency spectrum components 6Aa and by 0° in high-frequency spectrum components 6Ab, as depicted in FIG. 12.

Thus if the orientation of the analyzer 62 is adjusted to 90°, then the diffracted light 8A past the analyzer 62 may be used to reconstruct an image formed solely by the low-frequency spectrum components of the object light 3. This provides low-pass filtering. If the orientation of the analyzer 62 is adjusted to 0°, then the diffracted light 8A past the analyzer 62 may be used to reconstruct an image formed only by the high-frequency spectrum components of the object light 3. This permits high-pass filtering.

If the orientation of the analyzer 62 is adjusted to 45°, then the intensity of light is greater than that in effect when the orientation is 90° and less than when the orientation is 0°. In that case, the diffracted light 8A past the analyzer 62 may be used to reconstruct an image formed by the high- and the low-frequency spectrum components of the object light 3. This permits reconstruction of the original image.

As shown in FIG. 13, the analyzer 62 may be replaced by a polarizing beam splitter 64. In this setup, the diffracted light 6A from a hologram is subjected to inverse Fourier transform using the lens 61. Transformed diffracted light 7A entering the polarizing beam splitter 64 is split into two beams: diffracted light 8L transmitted through the splitter 64 and polarized by 90°, and diffracted light 8H reflected by the splitter 64 and polarized by 0°. The diffracted light 8L is applied to a photo detector 63L to form an image thereon, and the diffracted light 8H is input to a photo detector 63H to form an image thereon. This makes it possible to carry out low-pass and high-pass filtering at the same time.

More Experiments

In other experiments, the inventors of this invention recorded holograms using the setup of FIG. 10 and conducted low-pass and high-pass filtering by resorting to the setup of FIG. 12.

The optical storage medium 10 was constituted by polyester having cyanoazobenzene units in the side chain. The light source 21 in FIG. 8 was implemented using an oscillation line 515 nm of argon ion laser with its light intensity set to 5 W/cm$^2$.

The spatial light modulators 39 and 31 were each practiced using a liquid crystal panel (1.3 inch-type) for projector use having about 640×480 pixels, one pixel measuring about 42 $\mu$m×42 $\mu$m. The spatial light modulator 31 had its polarizing plate removed before use. The reducing optical system 58 was arranged to scale down by three-fourths the reference light 4 past the spatial light modulator 31.

Figure 14A:
FIGS. 14A through 14F are views depicting results of experiments conducted by the method of FIG. 12.
Figure 14B:
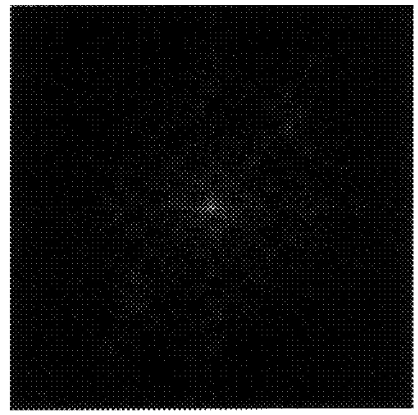
Figure 14C:

An image to be recorded, shown in FIG. 14A, was displayed on the spatial light modulator 39. The image was recorded as a hologram on the optical storage medium 10 by application of the reference light having the spatial polarization distribution shown in FIG. 10. The Fourier spectrum of the object light is indicated in FIG. 14B.

Figure 14D:
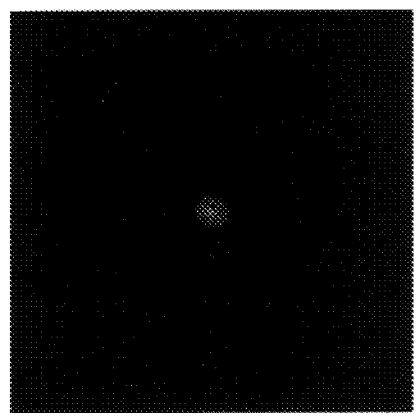
Figure 14E:
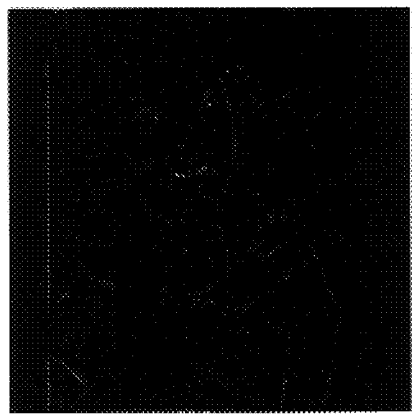
Figure 14F:
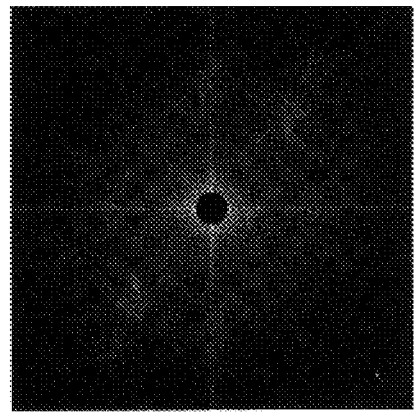

For reconstruction, reference light with 0° polarization as shown in FIG. 12 was emitted to the relevant stored hologram. Under reference light application with the orientation of the analyzer 62 adjusted to 90°, the diffracted light 8A produced a low-frequency component reconstructed image depicted in FIG. 14C. When the orientation of the analyzer was adjusted to 0°, the diffracted light 8A generated a high-frequency component reconstructed image given in FIG. 14E. The low-frequency spectrum components are shown in FIG. 14D and the high-frequency spectrum components in FIG. 14F.

Other Variations of Filtering

Figure 15A:
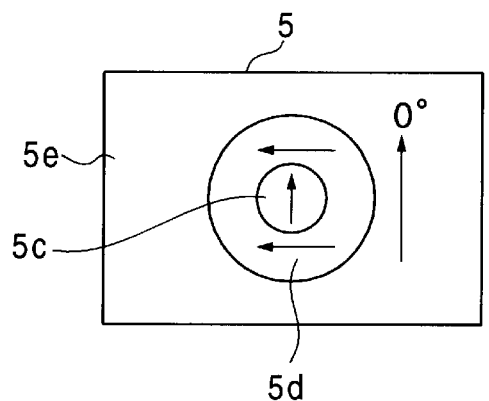
FIGS. 15A and 15B are schematic views of another filtering method embodying the invention.
Figure 15B:
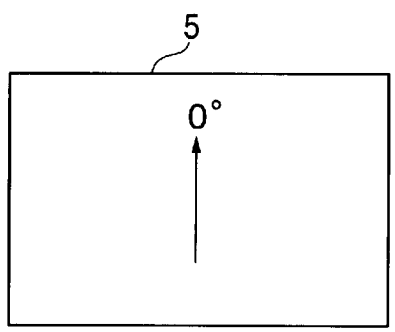
Figure 16A:
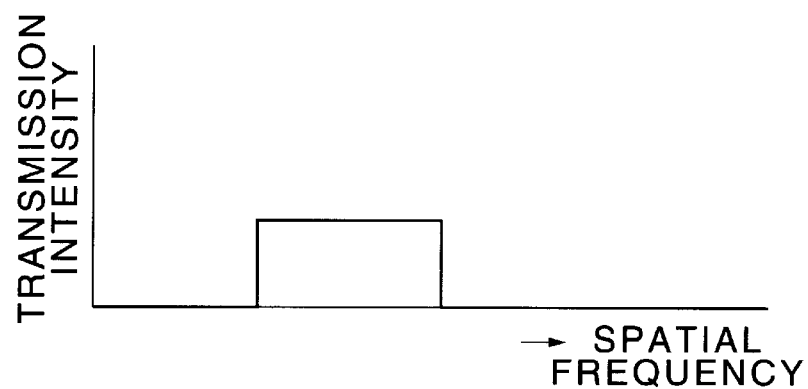
FIGS. 16A and 16B are views of characteristics given by a spatial frequency filter of FIGS. 15A and 15B.
Figure 16B:
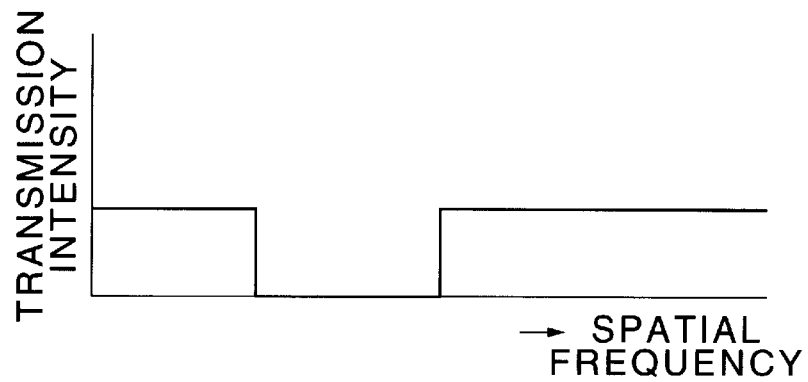

Suppose that as shown in FIG. 15A, the reference light for recording is arranged to have a spatial polarization distribution wherein a circular portion 5d corresponding to a specific spatial frequency band of Fourier transformed object light is polarized by 90° and wherein an inner portion 5c and an outer portion 5e adjacent to the portion 5d are polarized by 0°. Suppose also that as depicted in FIG. 15B, the reference light for reconstruction is arranged to be spatially coherent light polarized by 0°. On these assumptions, filtering based on a band-pass filter characteristic shown in FIG. 16A and filtering as per a band eliminator characteristic depicted in FIG. 16B are performed selectively depending on the adjusted orientation of the analyzer 62 if the analyzer 62 is used as shown in FIG. 12, and are carried out simultaneously if the polarizing beam splitter 64 is utilized as illustrated in FIG. 13.

If the spatial polarization distribution of the reference light for recording is replaced by the above-mentioned spatial polarization distribution, it is possible to execute such variations of filtering as differential filtering with its spatial frequency characteristic expressed by a linear function as well as Laplacian filtering with its spatial frequency characteristic expressed by a quadratic function (see S. H. Lee: Opt. Eng., 13, 196 (1974)). It is also possible to constitute a Gabor filter and a wavelet filter (see Y. Li and Y. Zhang: Opt. Eng., 31 (1992), pp. 1865–1885) which may be applied to multiple resolution analysis of stored images, image encoding, and image contraction.

Use of Constant Reference Light for Recording

The above examples of filtering were shown carried out using the reference light for recording with its spatial polarization distribution in conformity with a shape of a spatial frequency filter, and using the reference light for reconstruction with 0° polarization. Alternatively, the kinds of reference light may be switched for use between recording and reconstruction.

More specifically, the reference light with 0° polarization may be used for recording. For reconstruction involving illustratively low-pass or high-pass filtering, the reference light may be arranged to have the same spatial polarization distribution as that of the reference light 5 shown in FIG. 10 (which in fact is a recording optical system, the reference light being used for recording).

In the alternative case above, low-frequency spectrum components of the object light 3, recorded in a hologram using reference light components with 0° polarization, are retrieved as diffracted light components with 90° polarization through a 90° rotation using reference light components with 90° polarization. High-frequency spectrum components of the object light 3, recorded using reference light components with 0° polarization, are retrieved as diffracted light components with 0° polarization without rotations using reference light components with 0° polarization. The diffracted light 6A from the hologram has its low-frequency spectrum 6Aa polarized by 90° and its high-frequency spectrum 6Ab polarized by 0° as shown in FIG. 12, i.e., in the same manner as in the above example.

As in the foregoing example, low-pass filtering is performed by adjusting the orientation of the analyzer 62 to 90°, and high-pass filtering is conducted by setting the orientation of the analyzer 62 to 0°.

If the reference light for reconstruction is also arranged to be light with 0° polarization, an original image is reconstructed by application of that reference light. If the reference light for reconstruction is given a spatial polarization distribution such as that of the reference light 5 in FIG. 15A (which shows reference light 5 for recording), band-pass filtering or band eliminator filtering is carried out by use of that reference light.

Whereas the earlier examples were shown having the shape (i.e., characteristic) of the spatial frequency filter fixed at the time of recording, the characteristic of the spatial frequency filter in this example may be set and altered as desired at the time of reconstruction.

Wavelet Transform (FIGS. 17A through 19F)

The filtering method of this invention may be applied to wavelet transform. Optical wavelet transform is discussed in detail illustratively by D. Mendlovic and N. Konforti in "APPLIED OPTICS, Vol. 32 (1993), pp. 6542–6546). For the purpose of simplification, wavelet transform is explained here using an one-dimensional signal f(x).

Wavelet transform of the signal pattern f(x) is defined by the expression:

$$W_f(a, b) = \int_{-\infty}^{\infty} f(x) h^*_{a, b}(x) dx \tag{7}$$

where, $\int_{-\infty}^{\infty}$ signifies integration from $-\infty$ to $\infty$.

In the expression above, $h_{a, b}(x)$ is a daughter wavelet defined as $$h_{a, b}(x) = a^{-\frac{1}{2}} h\{(x-b)/a\} \tag{8}$$

The daughter wavelet is expressed by scale "a" and translate "b" of a mother wavelet function.

A mother wavelet is typically defined as $$h(x) = \exp\{(x/x_0)^2/2\} \exp(i2\pi\omega_0 x) \tag{9}$$

where, $\omega_0$ is a spatial frequency.

The mother wavelet h(x) above having a Gaussian envelope is known as a Standard Morlet wavelet (see J. M. Combes, et al., eds., Wavelet: Time-Frequency Methods and Phase Space (Springer-Verlag, Berlin, 1989)).

Wavelet transform is based on scale "a" having an appropriate relation and is used to implement image decomposition at a sampling rate corresponding to the spatial frequency of the image in question. As such, wavelet transform is utilized effectively for multiple resolution analysis of images and image contraction.

Signals are sampled discretely in many practical applications in which a discrete scale "a" is used. In such cases, the scale "a" is defined as $$a = a_0^m \tag{10}$$

where, $a_0 > 1$ and m is an integer.

Given the definition of the expression (10), the expression (7) may be rearranged as follows:

$$W_f(m, b) = \int_{-\infty}^{\infty} f(x) h^*_{m, b}(x) dx \tag{11}$$

The daughter wavelet is defined as $$h_{m, b}(x) = (1/a_0^{m/2}) h\{(x-b)/a_0^m\} \tag{12}$$

Returning to the expression (7) or (11), it is understood that wavelet transform is constituted by a correlation value between the signal pattern f(x) on the one hand and the daughter wavelet $h_{a, b}(x)$ or $h_{m, b}(x)$ on the other hand.

Thus if a complex conjugate Fourier transformed image $H^*_{m,b}(\omega)$ or $H^*_{m,b}(\omega)$ of the daughter wavelet $h_{a,b}(x)$ or $h_{m,b}(x)$ is on a Fourier transform plane and if the signal pattern $f(x)$ is on an input plane, then wavelet transform is equivalent to a conventional double diffraction optical system. The recording optical system in FIG. 10 and the reconstruction optical system in FIG. 11 meet the above conditions.

Figure 17A:
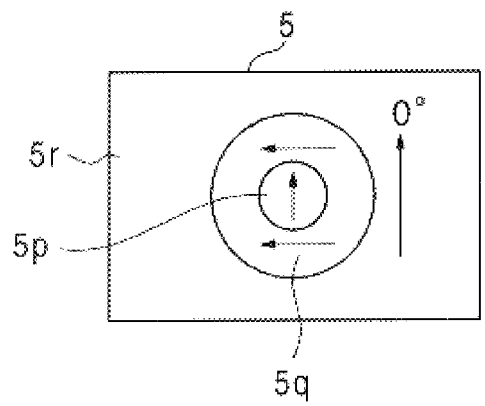
FIGS. 17A and 17B are schematic views of a wavelet transforming method embodying the invention.
Figure 17B:
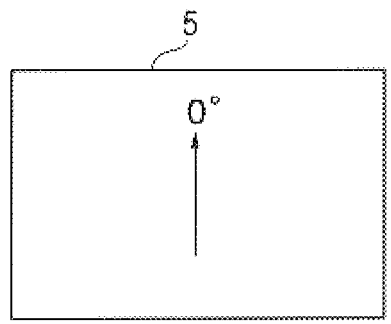

Wavelet transform is performed by use of the setup in FIG. 8 as follows: illustratively, the reference light for recording is arranged to have a spatial polarization distribution wherein a circular portion 5q corresponding to the scale "m" above is polarized by 90° and wherein an inner portion 5p and an outer portion 5r adjacent to the portion 5q are polarized by 0°, as depicted in FIG. 17A. The reference light for reconstruction is arranged to be light polarized by 0° as shown in FIG. 17B.

The spatial polarization distribution of the reference light for recording in FIG. 17A corresponds to the complex conjugate Fourier transformed image $H^*_{m,b}(\omega)$ of the daughter wavelet $h_{m,b}(x)$ having a value "m" in the expression (12) above. The angle of polarization is 90° for the image in question and 0° for the rest.

Object light with 0° polarization subjected to Fourier transform is recorded as a hologram using the reference light having the spatial polarization distribution above. When the hologram thus recorded is retrieved using the reference light with 0° polarization shown in FIG. 17B, only the spatial frequency components corresponding to the scale "m" of the object light are polarized by 90°. Splitting such spatial frequency components by an analyzer or by a polarizing beam splitter provides a wavelet transformed image on the scale "m."

Figure 18A:
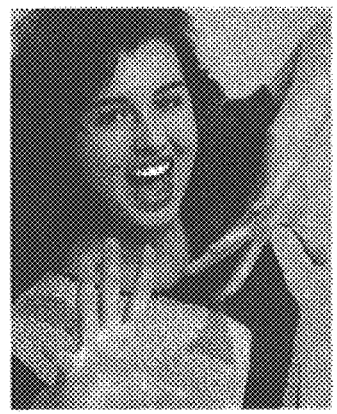
FIGS. 18A and 18B are views of results from experiments conducted by the method of FIGS. 17A and 17B.
Figure 18B:
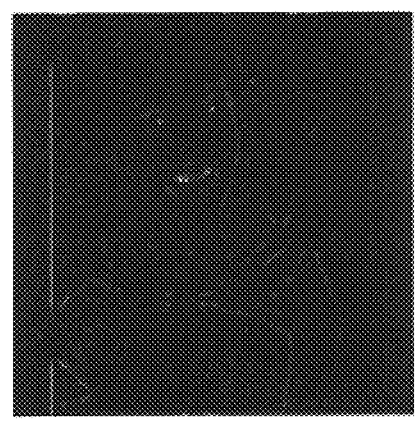

FIGS. 18A and 18B indicate what happens to the image in FIG. 14A as a result of wavelet transform. FIG. 18A shows the recorded image prior to wavelet transform, and FIG. 18B depicts a wavelet transformed image on the scale "m" following the transform.

Figure 19A:
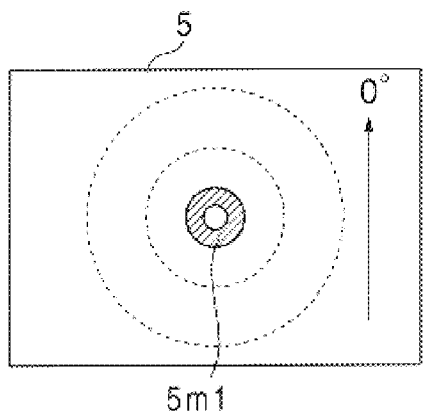
FIGS. 19A through 19F are views of another wavelet transforming method embodying the invention and results from experiments conducted by the method.

After Fourier transformed object light with 0° polarization has been recorded as a hologram using spatially constant reference light with 0° polarization, the recorded hologram may be retrieved using reference light with its daughter wavelet $h_{m,b}(x)$ on scale "m" polarized by 90°. This also provides the wavelet transformed image. In this case, as shown in FIGS. 19A through 19C, the reference light for image retrieval is changed in its spatial polarization distribution in keeping with the varying scale "m" (portions 5m1, 5m2 and 5m3 shown polarized by 90° in FIGS. 19A through 19C respectively). This provides wavelet transformed images on diverse scales.

Figure 19D:
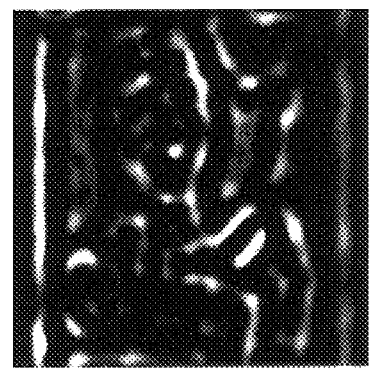
Figure 19B:
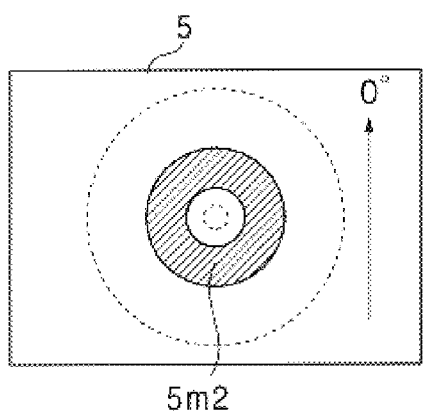
Figure 19E:
Figure 19C:
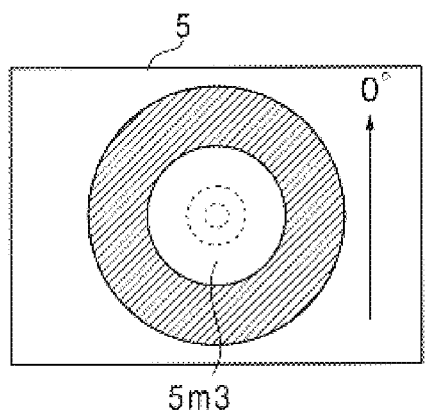
Figure 19F:
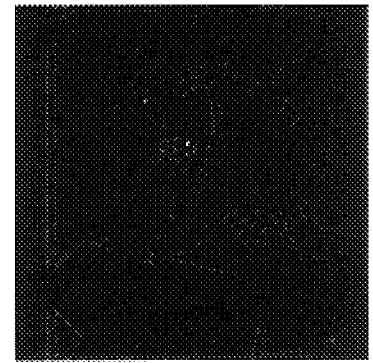

FIGS. 19D, 19E and 19F show wavelet transformed images on varying scales "m". These images are obtained when the image in FIG. 14A is subjected to wavelet transform with the spatial polarization distribution of the reference light for retrieval altered in keeping with the scale "m" being set for 1, 2 and 3.

Matched Filtering (FIGS. 20 through 22D)

Figure 20:
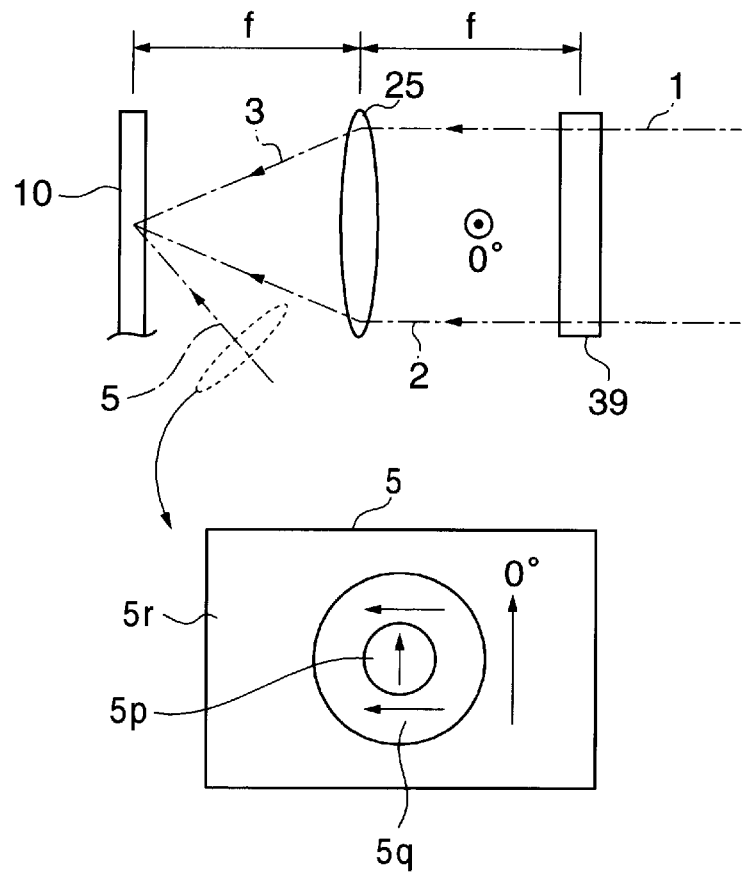
FIG. 20 is a schematic view of a recording optical system for use with a matched filtering method embodying the invention.

When the setup of FIG. 8 is used to carry out matched filtering, Fourier transformed object light 3 with 0° polarization of the target image to be retrieved is recorded as a hologram using the reference light 5 as shown in FIG. 20. In this setup, as illustrated, the reference light 5 is arranged to have a spatial polarization distribution wherein a circular portion 5q corresponding to the scale "m" of wavelet transform is polarized by 90° and wherein an inner portion 5p and an outer portion 5r adjacent to the portion 5q are polarized by 0°.

Figure 21:
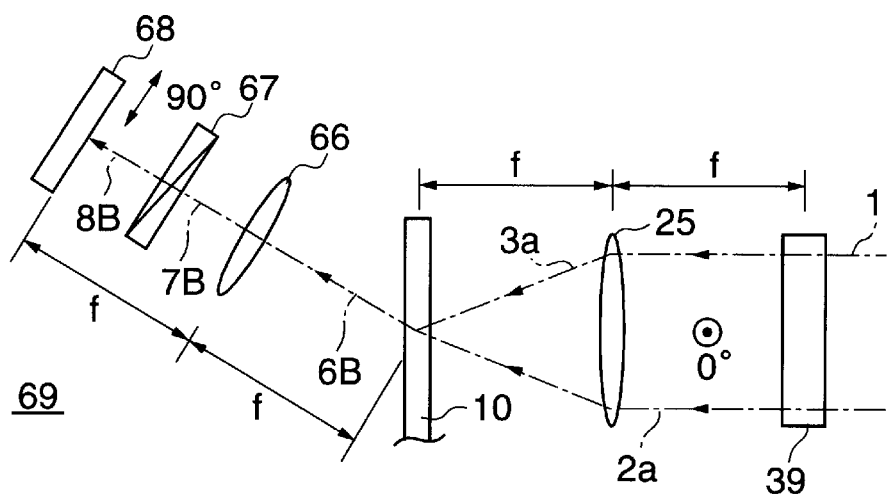
FIG. 21 is a schematic view of a correlation computing optical system for use with the matched filtering method of the invention.

For correlation computation (image retrieval), as depicted in FIG. 21, Fourier transformed object light 3a with 0° polarization of the target object is used to retrieve the hologram recorded as described above. In this case, if the retrieved image matches the target image which forms retrieval light, an autocorrelation image is obtained at the focal point of the lens 66; if the retrieved image is found to differ from the target image, a cross correlation image is acquired.

In the case above, the Fourier transformed object light 3 with 0° polarization of the target object to be retrieved has been recorded as a hologram using the reference light with its spatial polarization distribution shown in FIG. 20. Of the spatial frequency components of diffracted light 6B obtained as a correlation image spectrum, those corresponding to the scale "m" and recorded using reference light components with 90° polarization are retrieved as diffracted light components with 90° polarization through a 90° rotation using the object light 3a with 0° polarization. The other spatial frequency components of the diffracted light 6B which were recorded using reference light components with 0° polarization are retrieved as diffracted light components with 0° polarization without rotations using the object light 3a with 0° polarization.

Thus unlike conventional matched filtering, those spatial frequency components of the correlation image spectrum which correspond to the scale "m" differ by 90° in polarization from the other spatial frequency components of the spectrum.

It follows that setting the orientation of the analyzer 67 to 90° as shown in FIG. 21 provides a correlation image having only those spatial frequency components of the diffracted light 8B past the analyzer 67 which correspond to the scale "m." In this manner, the computed correlation value corresponding to the scale "m" is isolated from among the spectrum components.

Figure 22A:
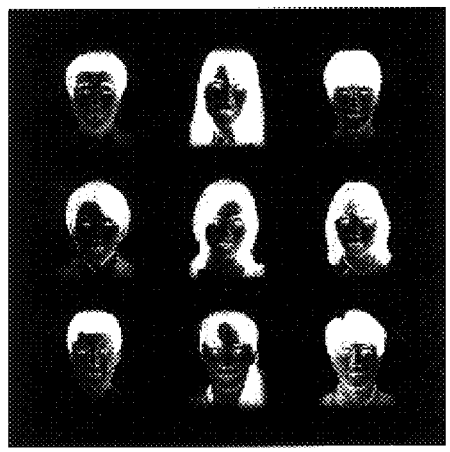
FIGS. 22A through 22D are views of results from experiments conducted by the inventive matched filtering method.
Figure 22B:
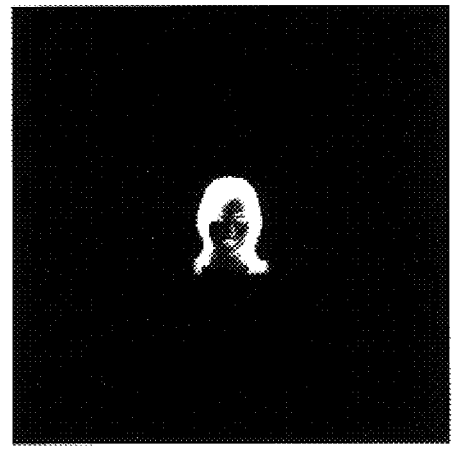

FIG. 22A shows an image recorded by the above-described matched filtering method as a hologram of nine portraits having object light. FIG. 22B indicates a target image to be retrieved under application onto the hologram.

Figure 22C:
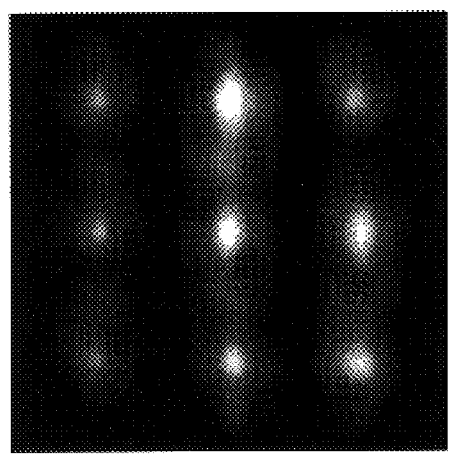
Figure 27A:
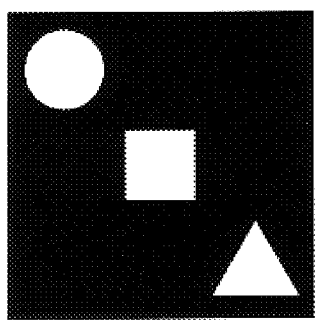
FIGS. 27A through 27C are views of other results from experiments conducted by the conventional matched filtering method.
Figure 27B:
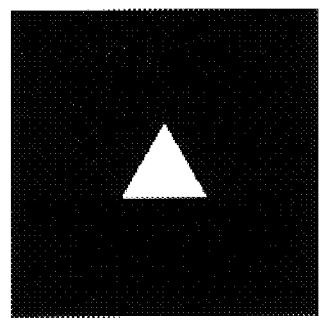
Figure 27C:
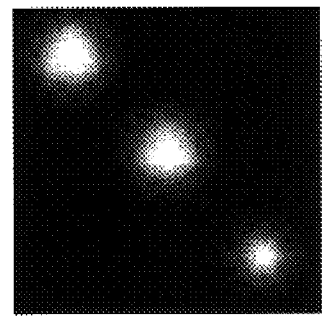
Figure 28A:
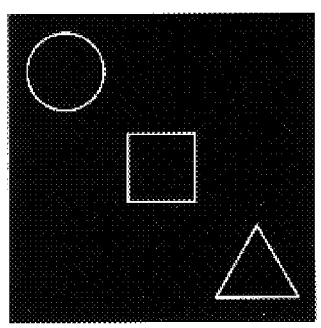
FIGS. 28A through 28C are views of other results from experiments conducted by the conventional matched filtering method.
Figure 28B:
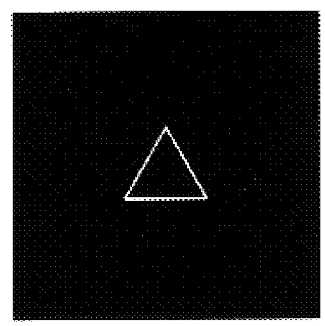
Figure 28C:
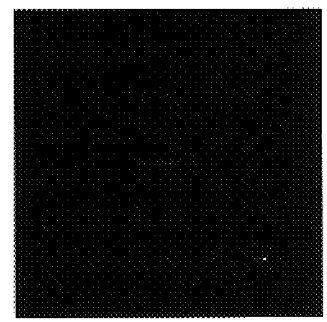

In the case above, the diffracted light 7B upstream of the analyzer 67 in FIG. 21 forms a correlation image depicted in FIG. 22C. This image, like the correlation image in FIG. 27C, is not conducive to distinguishing between autocorrelation values and cross correlation values. Downstream the analyzer 67, the diffracted light BB constitutes a correlation image in FIG. 22D which is conducive to easily distinguishing between autocorrelation values and cross correlation values. That is because the diffracted light 8B past the analyzer 67 is subject to correlation computation only between the spectrum components which exclude zero-order frequencies of the target and the retrieved image and which are dependent on image shape.

Figure 22D:
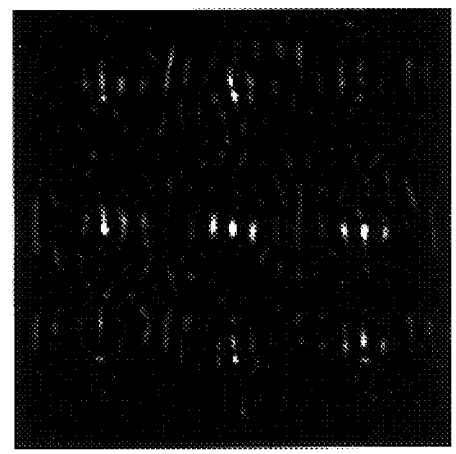
Figure 23:
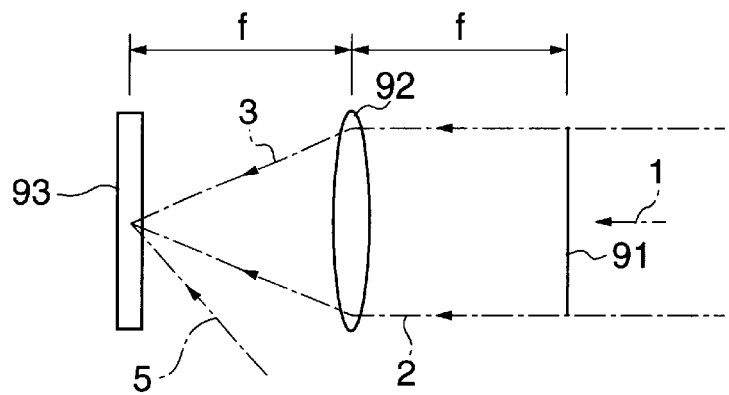
FIG. 23 is a schematic view of a conventional holographic recording method.
Figure 24:
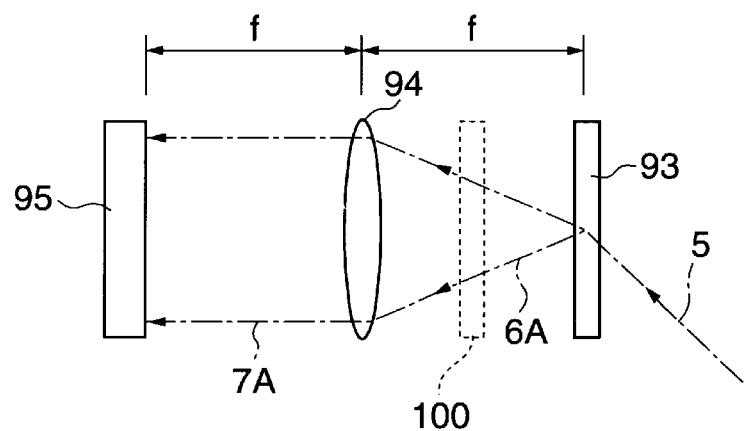
FIG. 24 is a schematic view of a conventional holographic reconstructing method and a conventional filtering method.
Figure 25:
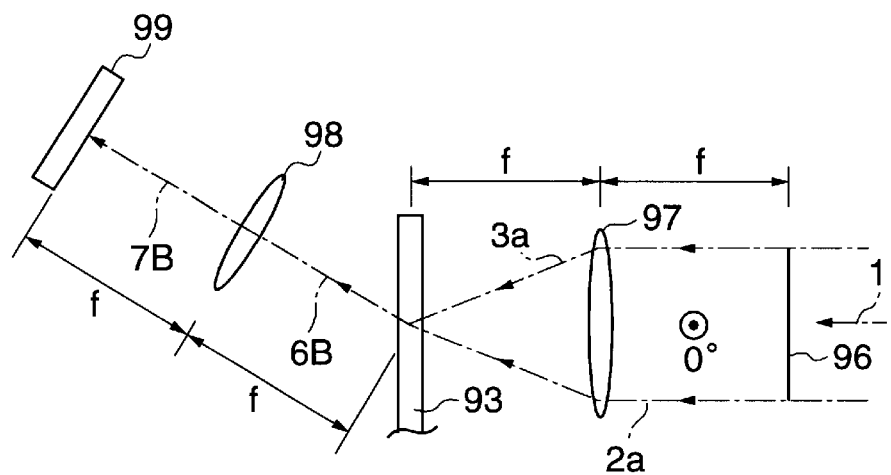
FIG. 25 is a schematic view of a conventional matched filtering method.
Figure 26A:
FIGS. 26A through 26C are views of results from experiments conducted by the conventional matched filtering method.
Figure 26B:
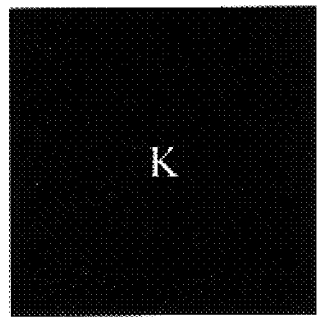
Figure 26C:
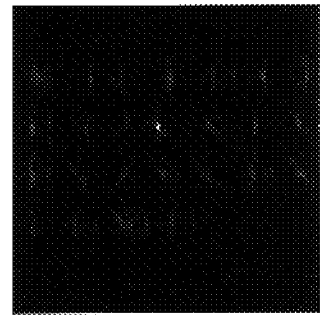

More specifically, the correlation image in FIG. 22C is such that an autocorrelation image of the desired portrait is approximately the same in intensity as cross correlation images with respect to the other portraits. The similarity in image intensity makes it impossible to recognize the relevant portrait for authorization. That is because the low spatial frequency spectrum components represented by the cheeks on the faces are common to all nine portraits. In contrast, the correlation image in FIG. 22D is such that an autocorrelation image of the desired portrait is significantly higher in intensity than cross correlation images with regard to the other portraits. In fact, the autocorrelation image alone is appreciably highlighted because correlation computation has been performed between the spatial frequency spectrum components characteristic of human faces.

The matched filtering of this invention constitutes exactly what is known as optical wavelet matched filtering. To obtain correlation images with high S/N ratios through wavelet matched filtering requires establishing a suitable scale "m" in accordance with the target image to be handled.

Conventional wavelet matched filtering is discussed illustratively by J. Widjada and Y. Tomita in "Optics Communications, 117, pp. 123–126 (1995)."

As described, this invention provides a method for filtering based on desired spatial frequency characteristics during the process of recording or reconstructing holograms, whereby complementary variations of filtering such as low-pass and high-pass filtering are carried out simultaneously without the loss of Fourier spectrum frequency components and without the need for a complicated or bulky apparatus.

This invention also provides a method for matched filtering of high recognition capability without losing functions of data recording and reconstruction as well as high-speed transmission and retrieval features and mass storage capacity characteristic of a hologram memory.

According to the invention, high-definition analog images are stored beforehand in a holographic memory. A reconstructed image or a correlation image of desired spatial frequency components is then output at a desired resolution and with a high SIN ratio by simply extracting necessary polarization components of the image in question from the stored hologram.

The inventive method offers image processing functions including wavelet transform. Processing loads on the CPU are alleviated significantly by outputting processed images such as wavelet transformed images at high speed from the holographic memory. This feature allows the holographic memory to be used not only as a high-speed, high-capacity digital data file memory but also as part of a high-definition image server.

Documents yet to be converted to electronic form such as old patents may be stored as analog images in the holographic memory. Once recorded as holograms, such documents may be searched for and retrieved rapidly and precisely in terms of words, phrases and sentences used as keywords throughout a single or plural pages. In addition, a target location may be detected from high-definition images stored as holograms. Furthermore, desired information may be retrieved accurately at high speed from a holographic memory database including personal identification information such as portraits, fingerprints and the like.

As many apparently different embodiments of this invention may be made without departing from the spirit and scope thereof, it is to be understood that the invention is not limited to the specific embodiments thereof except as defined in the appended claims.

What is claimed is:

1. A holographic recording method comprising the step of storing a hologram onto an optical storage medium by simultaneously irradiating the optical storage medium with Fourier transformed object light and reference light which has a spatial polarization distribution in conformity with a shape of a spatial frequency filter.

2. The holographic recording method according to claim 1, wherein the optical storage medium is a disc type medium, the method further comprising the steps of:
   rotating the optical storage medium; and
   moving radially over the optical storage medium an optical head which generates the object light and the reference light to irradiate the optical storage medium.

3. A holographic recording apparatus comprising:
   a light source which emits coherent light;
   a first spatial light modulator which modulates in intensity the light from the light source so as to generate object light;
   a first image forming optical system which irradiates an optical storage medium with the object light;
   a second spatial light modulator which modulates in polarization the light from the light source so as to generate reference light having a spatial polarization distribution in conformity with a shape of a spatial frequency filter; and
   a second image forming optical system which irradiates the optical storage medium with the reference light.

4. The holographic recording apparatus according to claim 3, further comprising a lens which subjects the object light to Fourier transform.

5. The holographic recording apparatus according to claim 3, wherein the optical storage medium is a disc type medium, the apparatus further comprising:
   a medium driving facility which rotates the optical storage medium; and
   a head moving facility which moves radially over the optical storage medium an optical head which comprises the light source, the first and the second spatial light modulators, and the first and the second image forming optical systems.

6. An optical storage medium having a hologram stored thereon by Fourier transformed object light and by reference light which has a spatial polarization distribution in conformity with a shape of a spatial frequency filter.

7. The optical storage medium according to claim 6, wherein an image stored in the hologram is an analog image such as a document.

8. The optical storage medium according to claim 6, wherein an image stored in the hologram is a personal identification image.

9. The optical storage medium according to claim 6, wherein the optical storage medium is a disc type medium.

10. A filtering method comprising the step of irradiating an optical storage medium having a hologram stored thereon by Fourier transformed object light and by reference light which has a spatial polarization distribution in conformity with a shape of a spatial frequency filter with retrieval light having a spatial polarization distribution different from that of the reference light in order to retrieve part or all of spatial frequency spectrum components of the object light.

11. The filtering method according to claim 10, wherein the retrieval light is spatially constant polarized light.

12. A filtering method comprising the step of irradiating an optical storage medium having a hologram stored thereon by Fourier transformed object light and by reference light with retrieval light which has a spatial polarization distribution in conformity of a shape of a spatial frequency filter in order to retrieve part or all of spatial frequency spectrum components of the object light.

13. The filtering method according to claim 10, wherein the optical storage medium is a disc type medium, the method further comprising the steps of:
   rotating the optical storage medium; and
   moving radially over the optical storage medium an optical head which generates the retrieval light to irradiate the optical storage medium.

14. A filtering apparatus comprising:
   a light source which emits coherent light;
   a spatial light modulator which modulates in polarization the light from the light source so as to generate retrieval light having a spatial polarization distribution different from that of reference light, the retrieved light being applied onto an optical storage medium having holograms stored thereon by Fourier transformed object light and by the reference light; and an image forming optical system for applying the retrieval light onto the optical storage medium.

15. The filtering apparatus according to claim 14, wherein the optical storage medium is a disc type medium, the apparatus further comprising:

a medium driving facility which rotates the optical storage medium; and a head moving facility which moves radially over the optical storage medium an optical head which comprises the light source, the spatial light modulator and the image forming optical system.

16. A filtering method comprising the step of irradiating an optical storage medium having a hologram stored thereon by Fourier transformed object light and by reference light which has a spatial polarization distribution in conformity with a shape of a spatial frequency filter with Fourier transformed object light of a target image to be retrieved in order to compute and obtain correlation values on part or all of spatial frequency spectrum components between an image stored in the hologram on the one hand and the target image on the other hand.

17. The filtering method according to claim 16, wherein at least one of the image stored in the hologram and the target image is an analog image such as a document.

18. The filtering method according to claim 16, wherein at least one of the image stored in the hologram and the target image is a personal identification image.

19. The filtering method according to claim 16, wherein the optical storage medium is a disc type medium, the method further comprising the steps of:

rotating the optical storage medium; and moving radially over the optical storage medium an optical head which generates the Fourier transformed object light of the target image to irradiate the optical storage medium.

20. A filtering apparatus comprising:

a light source which emits coherent light;

a spatial light modulator which modulates in intensity the light from the light source so as to generate object light of a target image to be retrieved; and an image forming optical system which irradiates, with the object light, an optical storage medium having a hologram stored thereon by Fourier transformed object light of the target image and by reference light which has a spatial polarization distribution in conformity with a shape of a spatial frequency filter.

21. The filtering apparatus according to claim 20, further comprising a lens which subjects the object light of the target image to Fourier transform.

22. The filtering apparatus according to claim 20, wherein an image stored in the hologram is an analog image such as a document.

23. The filtering apparatus according to claim 20, wherein an image stored in the hologram is a personal identification image.

24. The filtering apparatus according to claim 20, wherein the optical storage medium is a disc type medium, the apparatus further comprising:

a medium driving facility which rotates the optical storage medium; and a head moving facility which moves radially over the optical storage medium an optical head which comprises the light source, the spatial light modulator and the image forming optical system.

25. A filtering apparatus comprising:

a light source which emits coherent light;

a first spatial light modulator which modulates in intensity the light from the light source so as to generate object light of a target image to be retrieved;

a first image forming optical system which irradiates, with the object light, an optical storage medium having a hologram stored thereon by Fourier transformed object light of the target image and by reference light;

a second spatial light modulator which modulates in polarization the light from the light source so as to generate retrieval light having a spatial polarization distribution different from that of the reference light;

a second image forming optical system which irradiates the optical storage medium with the retrieval light;

a first photo detector which detects first diffracted light obtained by irradiating the holograms with the object light of the target image; and a second photo detector which detects second diffracted light obtained by irradiating the holograms with the retrieval light.

26. The filtering apparatus according to claim 25, further comprising a lens which subjects the object light of the target image to Fourier transform.

27. The filtering apparatus according to claim 25, further comprising a lens which subjects the first and the second diffracted light to inverse Fourier transform.

28. The filtering apparatus according to claim 25, further comprising a polarizing element which extracts part of polarized components in the first and the second diffracted light.

29. The filtering apparatus according to claim 25, wherein at least one of an image stored in the hologram and the target image is an analog image such as a document.

30. The filtering apparatus according to claim 25, wherein at least one of an image stored in the hologram and the target image is a personal identification image.

31. The filtering apparatus according to claim 25, wherein the optical storage medium is a disc type medium, the apparatus further comprising:

a medium driving facility which rotates the optical storage medium; and a head moving facility which moves radially over the optical storage medium an optical head which comprises the light source, the first and the second spatial light modulators, the first and the second image forming optical systems, and the first and the second photo detectors.

* * * * *